(12) United States Patent  
Stephanou et al.

(10) Patent No.: US 9,024,910 B2  
(45) Date of Patent: May 5, 2015

(54) TOUCHSCREEN WITH BRIDGED FORCE-SENSITIVE RESISTORS

(75) Inventors: Philip Jason Stephanou, Mountain View, CA (US); Nicholas Ian Buchan, San Jose, CA (US); David William Burns, San Jose, CA (US); Kristopher Andrew Lavery, San Jose, CA (US); Srinivasan Kodaganallur Ganapathi, Palo Alto, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 409 days.

(21) Appl. No.: 13/453,923

(22) Filed: Apr. 23, 2012

(65) Prior Publication Data

US 2013/0278542 A1 Oct. 24, 2013

(51) Int. Cl.
  *G06F 3/045* (2006.01)
  *G06F 3/041* (2006.01)
  *G06F 3/044* (2006.01)

(52) U.S. Cl.
  CPC ............. *G06F 3/0414* (2013.01); *G06F 3/044* (2013.01); *G06F 2203/04103* (2013.01); *G06F 2203/04106* (2013.01); *G06F 2203/04111* (2013.01)

(58) Field of Classification Search
  CPC ........................................................ G06F 3/045
  See application file for complete search history.

(56) References Cited

U.S. PATENT DOCUMENTS

| | | | |
|---|---|---|---|
| 4,066,853 A | 1/1978 | Zenk | |
| 4,293,734 A | 10/1981 | Pepper, Jr. | |
| 4,570,149 A | 2/1986 | Thornburg et al. | |
| 4,733,222 A | 3/1988 | Evans | |
| 4,734,034 A | 3/1988 | Maness et al. | |
| 4,856,993 A | 8/1989 | Maness et al. | |
| 4,963,702 A | 10/1990 | Yaniger et al. | |
| 5,033,291 A | 7/1991 | Podoloff et al. | |
| 5,053,585 A | 10/1991 | Yaniger | |
| 5,060,527 A | 10/1991 | Burgess | |

(Continued)

FOREIGN PATENT DOCUMENTS

| EP | 2352169 A1 | 8/2011 |
|---|---|---|
| EP | 2369456 A2 | 9/2011 |

(Continued)

OTHER PUBLICATIONS

International Search Report and Written Opinion—PCT/US2013/036979—ISA/EPO—Jun. 28, 2013.

(Continued)

*Primary Examiner* — Kathy Wang-Hurst
*Assistant Examiner* — Peijie Shen
(74) *Attorney, Agent, or Firm* — Weaver Austin Villeneuve & Sampson

(57) ABSTRACT

A touch sensor may include a digital resistive touch (DRT) sensor architecture that is substantially free of air gaps. The DRT touch sensor may include a layer of force-sensitive resistor (FSR) material on an array of row and column electrodes. The electrodes may be formed on a substantially transparent substrate. Near the intersection of each row and column, one or more thin transparent patterned conductive bridges may be situated above the FSR. The conductive bridges may be configured for electrical connection with row and column electrodes when force is applied to the conductive bridge or surface of the touch sensor. Some touch sensors may include both DRT and projected capacitive touch (PCT) functionality.

32 Claims, 22 Drawing Sheets

(56) References Cited

U.S. PATENT DOCUMENTS

| | | |
|---|---|---|
| 5,241,308 A | 8/1993 | Young |
| 5,296,837 A | 3/1994 | Yaniger |
| 5,302,936 A | 4/1994 | Yaniger |
| 5,400,160 A | 3/1995 | Takahashi et al. |
| 5,420,936 A | 5/1995 | Fitzpatrick et al. |
| 5,429,006 A | 7/1995 | Tamori |
| 5,505,072 A | 4/1996 | Oreper |
| 5,510,783 A | 4/1996 | Findlater et al. |
| 5,541,570 A | 7/1996 | McDowell |
| 5,756,904 A | 5/1998 | Oreper et al. |
| 5,796,858 A | 8/1998 | Zhou et al. |
| 5,905,209 A | 5/1999 | Oreper |
| 5,940,526 A | 8/1999 | Setlak et al. |
| 5,943,044 A | 8/1999 | Martinelli et al. |
| 5,963,679 A | 10/1999 | Setlak |
| 5,982,894 A | 11/1999 | McCalley et al. |
| 5,989,700 A | 11/1999 | Krivopal |
| 6,021,211 A | 2/2000 | Setlak et al. |
| 6,032,542 A | 3/2000 | Warnick et al. |
| 6,035,398 A | 3/2000 | Bjorn |
| 6,047,281 A | 4/2000 | Wilson et al. |
| 6,047,282 A | 4/2000 | Wilson et al. |
| 6,067,368 A | 5/2000 | Setlak et al. |
| 6,069,970 A | 5/2000 | Salatino et al. |
| 6,070,159 A | 5/2000 | Wilson et al. |
| 6,088,471 A | 7/2000 | Setlak et al. |
| 6,088,585 A | 7/2000 | Schmitt et al. |
| 6,097,035 A | 8/2000 | Belongie et al. |
| 6,098,330 A | 8/2000 | Schmitt et al. |
| 6,114,862 A | 9/2000 | Tartagni et al. |
| 6,122,737 A | 9/2000 | Bjorn et al. |
| 6,125,192 A | 9/2000 | Bjorn et al. |
| 6,181,807 B1 | 1/2001 | Setlak et al. |
| 6,211,860 B1 | 4/2001 | Bunsen |
| 6,239,790 B1 | 5/2001 | Martinelli et al. |
| 6,259,804 B1 | 7/2001 | Setlak et al. |
| 6,272,936 B1 | 8/2001 | Oreper et al. |
| 6,291,568 B1 | 9/2001 | Lussey |
| 6,305,073 B1 | 10/2001 | Badders, Jr. |
| 6,320,394 B1 | 11/2001 | Tartagni |
| 6,346,739 B1 | 2/2002 | Lepert et al. |
| 6,360,004 B1 | 3/2002 | Akizuki |
| 6,400,836 B2 | 6/2002 | Senior |
| 6,408,087 B1 | 6/2002 | Kramer |
| 6,437,583 B1 | 8/2002 | Tartagni et al. |
| 6,440,814 B1 | 8/2002 | Lepert et al. |
| 6,483,931 B2 | 11/2002 | Kalnitsky et al. |
| 6,495,069 B1 | 12/2002 | Lussey et al. |
| 6,496,021 B2 | 12/2002 | Tartagni et al. |
| 6,501,284 B1 | 12/2002 | Gozzini |
| 6,512,381 B2 | 1/2003 | Kramer |
| 6,555,024 B2 | 4/2003 | Ueda et al. |
| 6,578,436 B1 | 6/2003 | Ganapathi et al. |
| 6,628,812 B1 | 9/2003 | Setlak et al. |
| 6,643,389 B1 | 11/2003 | Raynal et al. |
| 6,646,540 B1 | 11/2003 | Lussey |
| 6,647,133 B1 | 11/2003 | Morita et al. |
| 6,667,439 B2 | 12/2003 | Salatino et al. |
| 6,672,174 B2 | 1/2004 | Deconde et al. |
| 6,683,971 B1 | 1/2004 | Salatino et al. |
| 6,694,822 B1 | 2/2004 | Ganapathi et al. |
| 6,731,120 B2 | 5/2004 | Tartagni |
| 6,737,329 B2 | 5/2004 | Lepert et al. |
| 6,741,729 B2 | 5/2004 | Bjorn et al. |
| 6,795,569 B1 | 9/2004 | Setlak |
| 6,799,275 B1 | 9/2004 | Bjorn |
| 6,819,784 B1 | 11/2004 | Sabatini et al. |
| 6,829,950 B2 | 12/2004 | Ganapathi et al. |
| 6,889,555 B1 | 5/2005 | Ganapathi |
| 6,889,565 B2 | 5/2005 | DeConde et al. |
| 6,927,581 B2 | 8/2005 | Gozzini |
| 6,941,001 B1 | 9/2005 | Bolle et al. |
| 6,950,539 B2 | 9/2005 | Bjorn et al. |
| 6,950,541 B1 | 9/2005 | Setlak et al. |
| 6,964,205 B2 | 11/2005 | Papakostas et al. |
| 6,970,584 B2 | 11/2005 | O'Gorman et al. |
| 6,987,871 B2 | 1/2006 | Kalnitsky et al. |
| 6,998,855 B2 | 2/2006 | Tartagni |
| 7,030,860 B1 | 4/2006 | Hsu et al. |
| 7,049,166 B2 | 5/2006 | Salatino et al. |
| 7,050,045 B2 | 5/2006 | Baker et al. |
| 7,059,201 B2 | 6/2006 | Prakash et al. |
| 7,068,142 B2 | 6/2006 | Watanabe et al. |
| 7,073,397 B2 | 7/2006 | Ganapathi |
| 7,076,089 B2 | 7/2006 | Brandt et al. |
| 7,077,010 B2 | 7/2006 | Ganapathi |
| 7,081,888 B2 | 7/2006 | Cok et al. |
| 7,084,642 B2 | 8/2006 | Gozzini |
| 7,088,114 B2 | 8/2006 | Gozzini |
| 7,099,496 B2 | 8/2006 | Benkley, III |
| 7,113,179 B2 | 9/2006 | Baker et al. |
| 7,116,209 B2 | 10/2006 | Hermann et al. |
| 7,145,432 B2 | 12/2006 | Lussey et al. |
| 7,146,024 B2 | 12/2006 | Benkley, III |
| 7,197,168 B2 | 3/2007 | Russo |
| 7,213,323 B2 | 5/2007 | Baker et al. |
| 7,214,953 B2 | 5/2007 | Setlak et al. |
| 7,231,070 B2 | 6/2007 | Bjorn et al. |
| 7,239,227 B1 | 7/2007 | Gupta et al. |
| 7,256,589 B2 | 8/2007 | Andrade |
| 7,256,768 B2 | 8/2007 | Bathiche |
| 7,258,026 B2 | 8/2007 | Papakostas et al. |
| 7,259,573 B2 | 8/2007 | Andrade |
| 7,274,413 B1 | 9/2007 | Sullivan et al. |
| 7,280,101 B2 | 10/2007 | Miyamoto |
| 7,280,677 B2 | 10/2007 | Chandler et al. |
| 7,280,679 B2 | 10/2007 | Russo |
| 7,290,323 B2 | 11/2007 | DeConde et al. |
| 7,301,435 B2 | 11/2007 | Lussey et al. |
| 7,316,167 B2 | 1/2008 | DeConde et al. |
| 7,321,701 B2 | 1/2008 | Setlak et al. |
| 7,348,966 B2 | 3/2008 | Hong et al. |
| 7,351,974 B2 | 4/2008 | Setlak |
| 7,358,514 B2 | 4/2008 | Setlak et al. |
| 7,358,515 B2 | 4/2008 | Setlak et al. |
| 7,361,919 B2 | 4/2008 | Setlak |
| 7,373,843 B2 | 5/2008 | Ganapathi et al. |
| 7,409,543 B1 | 8/2008 | Bjorn |
| 7,409,876 B2 | 8/2008 | Ganapathi et al. |
| 7,418,117 B2 | 8/2008 | Kim et al. |
| 7,424,136 B2 | 9/2008 | Setlak et al. |
| 7,433,729 B2 | 10/2008 | Setlak et al. |
| 7,437,953 B2 | 10/2008 | DeConde et al. |
| 7,460,109 B2 | 12/2008 | Safai et al. |
| 7,460,697 B2 | 12/2008 | Erhart et al. |
| 7,463,756 B2 | 12/2008 | Benkley, III |
| 7,474,772 B2 | 1/2009 | Russo et al. |
| 7,505,613 B2 | 3/2009 | Russo |
| 7,519,204 B2 | 4/2009 | Bjorn et al. |
| 7,522,753 B2 | 4/2009 | Kalnitsky et al. |
| 7,550,810 B2 | 6/2009 | Mignard et al. |
| 7,574,022 B2 | 8/2009 | Russo |
| 7,587,072 B2 | 9/2009 | Russo et al. |
| 7,590,837 B2 | 9/2009 | Bhansali et al. |
| 7,591,165 B2 | 9/2009 | Papakostas et al. |
| 7,594,442 B2 | 9/2009 | Kaiserman et al. |
| 7,599,530 B2 | 10/2009 | Boshra |
| 7,599,532 B2 | 10/2009 | Setlak et al. |
| 7,616,786 B2 | 11/2009 | Setlak |
| 7,616,787 B2 | 11/2009 | Boshra |
| 7,629,871 B2 | 12/2009 | Schrum et al. |
| 7,638,350 B2 | 12/2009 | DeConde et al. |
| 7,643,950 B1 | 1/2010 | Getzin et al. |
| 7,671,351 B2 | 3/2010 | Setlak et al. |
| 7,683,641 B2 | 3/2010 | Hargreaves et al. |
| 7,684,953 B2 | 3/2010 | Feist et al. |
| 7,689,012 B2 | 3/2010 | Neil et al. |
| 7,693,314 B2 | 4/2010 | Tykowski et al. |
| 7,697,729 B2 | 4/2010 | Howell et al. |
| 7,698,565 B1 | 4/2010 | Bjorn et al. |
| 7,708,191 B2 | 5/2010 | Vega |
| 7,728,959 B2 | 6/2010 | Waldman et al. |
| 7,734,074 B2 | 6/2010 | Setlak et al. |
| 7,751,595 B2 | 7/2010 | Russo |

(56) References Cited

U.S. PATENT DOCUMENTS

| | | |
|---|---|---|
| 7,751,601 B2 | 7/2010 | Benkley, III |
| 7,768,273 B1 | 8/2010 | Kalnitsky et al. |
| 7,773,139 B2 | 8/2010 | den Boer et al. |
| 7,801,766 B2 | 9/2010 | Bunger et al. |
| 8,724,038 B2 | 5/2014 | Ganapathi et al. |
| 8,743,082 B2 | 6/2014 | Ganapathi et al. |
| 2001/0032319 A1 | 10/2001 | Setlak |
| 2002/0018584 A1 | 2/2002 | Johnson |
| 2002/0027634 A1 | 3/2002 | Kang et al. |
| 2002/0041146 A1 | 4/2002 | Kim et al. |
| 2002/0166388 A1 | 11/2002 | Ganapathi et al. |
| 2002/0180923 A1 | 12/2002 | Aoyagi et al. |
| 2003/0086049 A1 | 5/2003 | Yamazaki et al. |
| 2003/0117543 A1 | 6/2003 | Chang |
| 2003/0215116 A1 | 11/2003 | Brandt et al. |
| 2004/0252867 A1 | 12/2004 | Lan et al. |
| 2005/0052428 A1 | 3/2005 | Hayashi et al. |
| 2005/0063571 A1 | 3/2005 | Setlak et al. |
| 2005/0063572 A1 | 3/2005 | Setlak et al. |
| 2005/0063573 A1 | 3/2005 | Setlak et al. |
| 2005/0069180 A1 | 3/2005 | Setlak et al. |
| 2005/0069181 A1 | 3/2005 | Setlak et al. |
| 2005/0078855 A1 | 4/2005 | Chandler et al. |
| 2005/0089202 A1 | 4/2005 | Setlak et al. |
| 2005/0089203 A1 | 4/2005 | Setlak |
| 2005/0100199 A1 | 5/2005 | Boshra |
| 2005/0110103 A1 | 5/2005 | Setlak |
| 2005/0117785 A1 | 6/2005 | Boshra |
| 2005/0129291 A1 | 6/2005 | Boshra |
| 2005/0179657 A1 | 8/2005 | Russo et al. |
| 2005/0199071 A1 | 9/2005 | Ganapathi |
| 2005/0199072 A1 | 9/2005 | Ganapathi |
| 2005/0231215 A1 | 10/2005 | Gozzini |
| 2005/0231216 A1 | 10/2005 | Gozzini |
| 2005/0244038 A1 | 11/2005 | Benkley, III |
| 2005/0244039 A1 | 11/2005 | Geoffroy et al. |
| 2006/0008128 A1 | 1/2006 | Setlak et al. |
| 2006/0011997 A1 | 1/2006 | Kalnitsky et al. |
| 2006/0062437 A1 | 3/2006 | O'Gorman et al. |
| 2006/0062439 A1 | 3/2006 | Setlak |
| 2006/0066586 A1 | 3/2006 | Gally et al. |
| 2006/0078174 A1 | 4/2006 | Russo |
| 2006/0083411 A1 | 4/2006 | Benkley, III |
| 2006/0088195 A1 | 4/2006 | Tykowski et al. |
| 2006/0093191 A1 | 5/2006 | Neil et al. |
| 2006/0097991 A1 | 5/2006 | Hotelling et al. |
| 2006/0103633 A1 | 5/2006 | Gioeli |
| 2006/0181521 A1 | 8/2006 | Perreault et al. |
| 2006/0182319 A1 | 8/2006 | Setlak et al. |
| 2006/0197753 A1 | 9/2006 | Hotelling |
| 2006/0273417 A1 | 12/2006 | Ganapathi et al. |
| 2007/0031011 A1 | 2/2007 | Erhart et al. |
| 2007/0086630 A1 | 4/2007 | Setlak et al. |
| 2007/0086634 A1 | 4/2007 | Setlak et al. |
| 2007/0096870 A1 | 5/2007 | Fisher |
| 2007/0098228 A1 | 5/2007 | Perreault |
| 2007/0122013 A1 | 5/2007 | Setlak et al. |
| 2007/0143715 A1 | 6/2007 | Hollins et al. |
| 2007/0207681 A1 | 9/2007 | Zabroda et al. |
| 2007/0236618 A1 | 10/2007 | Maag et al. |
| 2007/0289392 A1 | 12/2007 | DeConde et al. |
| 2007/0290124 A1 | 12/2007 | Neil et al. |
| 2007/0292007 A1 | 12/2007 | Neil |
| 2008/0013805 A1 | 1/2008 | Sengupta et al. |
| 2008/0018611 A1 | 1/2008 | Serban et al. |
| 2008/0030302 A1 | 2/2008 | Franza et al. |
| 2008/0060086 A1 | 3/2008 | Bhansali et al. |
| 2008/0062139 A1 | 3/2008 | Hotelling et al. |
| 2008/0063245 A1 | 3/2008 | Benkley et al. |
| 2008/0094690 A1 | 4/2008 | Luo et al. |
| 2008/0098483 A1 | 4/2008 | Bhansali et al. |
| 2008/0119069 A1 | 5/2008 | Ichiyama |
| 2008/0127308 A1 | 5/2008 | Bhansali et al. |
| 2008/0134284 A1 | 6/2008 | Bhansali et al. |
| 2008/0137843 A1 | 6/2008 | Bhansali et al. |
| 2008/0141383 A1 | 6/2008 | Bhansali et al. |
| 2008/0165139 A1 | 7/2008 | Hotelling et al. |
| 2008/0189792 A1 | 8/2008 | Bhansali et al. |
| 2008/0205714 A1 | 8/2008 | Benkley et al. |
| 2008/0219521 A1 | 9/2008 | Benkley et al. |
| 2008/0219522 A1 | 9/2008 | Hook |
| 2008/0226132 A1 | 9/2008 | Gardner |
| 2008/0228707 A1 | 9/2008 | Bhansali et al. |
| 2008/0240523 A1 | 10/2008 | Benkley et al. |
| 2008/0267462 A1 | 10/2008 | Nelson et al. |
| 2008/0270602 A1 | 10/2008 | Bhansali et al. |
| 2008/0273770 A1 | 11/2008 | Kohout |
| 2008/0276326 A1 | 11/2008 | Bhansali et al. |
| 2008/0279373 A1 | 11/2008 | Erhart et al. |
| 2008/0309631 A1 | 12/2008 | Westerman et al. |
| 2009/0003664 A1 | 1/2009 | Setlak et al. |
| 2009/0021487 A1 | 1/2009 | Tien |
| 2009/0058825 A1* | 3/2009 | Choi et al. .................. 345/173 |
| 2009/0067685 A1 | 3/2009 | Boshra et al. |
| 2009/0067686 A1 | 3/2009 | Boshra et al. |
| 2009/0067687 A1 | 3/2009 | Boshra et al. |
| 2009/0067688 A1 | 3/2009 | Boshra et al. |
| 2009/0067689 A1 | 3/2009 | Porter et al. |
| 2009/0070592 A1 | 3/2009 | Boshra et al. |
| 2009/0070593 A1 | 3/2009 | Boshra et al. |
| 2009/0123039 A1 | 5/2009 | Gozzini |
| 2009/0134966 A1 | 5/2009 | Baker |
| 2009/0150993 A1 | 6/2009 | Tilley |
| 2009/0152023 A1 | 6/2009 | Yeh et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0164797 A1 | 6/2009 | Kramer |
| 2009/0166411 A1 | 7/2009 | Kramer et al. |
| 2009/0169071 A1 | 7/2009 | Bond et al. |
| 2009/0225396 A1 | 9/2009 | Sampsell |
| 2009/0237374 A1 | 9/2009 | Li et al. |
| 2009/0243817 A1 | 10/2009 | Son |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0256817 A1* | 10/2009 | Perlin et al. .................. 345/174 |
| 2009/0256821 A1 | 10/2009 | Mamba et al. |
| 2009/0257626 A1 | 10/2009 | Sherlock et al. |
| 2009/0273573 A1 | 11/2009 | Hotelling |
| 2009/0279162 A1 | 11/2009 | Chui |
| 2009/0300771 A1 | 12/2009 | Bhansali et al. |
| 2009/0303196 A1 | 12/2009 | Furukawa |
| 2009/0316963 A1 | 12/2009 | Boshra |
| 2009/0322496 A1 | 12/2009 | Da |
| 2010/0001975 A1 | 1/2010 | Jiang et al. |
| 2010/0026451 A1 | 2/2010 | Erhart et al. |
| 2010/0044121 A1 | 2/2010 | Simon et al. |
| 2010/0062148 A1 | 3/2010 | Lussey et al. |
| 2010/0066650 A1 | 3/2010 | Lee et al. |
| 2010/0083000 A1 | 4/2010 | Kesanupalli |
| 2010/0096710 A1 | 4/2010 | Chou |
| 2010/0098303 A1 | 4/2010 | Chen |
| 2010/0102939 A1 | 4/2010 | Stewart |
| 2010/0110039 A1 | 5/2010 | Li |
| 2010/0119124 A1 | 5/2010 | Satyan |
| 2010/0127366 A1 | 5/2010 | Bond et al. |
| 2010/0141608 A1 | 6/2010 | Huang et al. |
| 2010/0176823 A1 | 7/2010 | Thompson et al. |
| 2010/0177940 A1 | 7/2010 | Dean et al. |
| 2010/0180136 A1 | 7/2010 | Thompson et al. |
| 2010/0189314 A1 | 7/2010 | Benkley et al. |
| 2010/0225607 A1 | 9/2010 | Kim |
| 2010/0262591 A1 | 10/2010 | Lee et al. |
| 2010/0279738 A1 | 11/2010 | Kim et al. |
| 2010/0321326 A1 | 12/2010 | Grunthaner et al. |
| 2011/0017524 A1 | 1/2011 | Chen et al. |
| 2011/0018826 A1 | 1/2011 | Shoji |
| 2011/0025617 A1 | 2/2011 | Hsih et al. |
| 2011/0026202 A1 | 2/2011 | Kai et al. |
| 2011/0037721 A1 | 2/2011 | Cranfill et al. |
| 2011/0050394 A1 | 3/2011 | Zhang et al. |
| 2011/0050624 A1 | 3/2011 | Lee et al. |
| 2011/0063245 A1* | 3/2011 | Chiang .................. 345/174 |

(56) References Cited

U.S. PATENT DOCUMENTS

| | | |
|---|---|---|
| 2011/0074717 A1 | 3/2011 | Yamashita |
| 2011/0198712 A1 | 8/2011 | Okumura et al. |
| 2011/0254758 A1 | 10/2011 | Lin et al. |
| 2011/0273394 A1 | 11/2011 | Young et al. |
| 2012/0090757 A1 | 4/2012 | Buchan et al. |
| 2012/0092127 A1 | 4/2012 | Ganapathi et al. |
| 2012/0092279 A1* | 4/2012 | Martin .................... 345/173 |
| 2012/0092293 A1 | 4/2012 | Ganapathi et al. |
| 2012/0092294 A1 | 4/2012 | Ganapathi et al. |
| 2012/0092324 A1 | 4/2012 | Buchan et al. |
| 2012/0092350 A1 | 4/2012 | Ganapathi et al. |

FOREIGN PATENT DOCUMENTS

| | | |
|---|---|---|
| JP | 2000187239 A | 7/2000 |
| JP | 3150179 | 3/2001 |
| JP | 2004138416 | 5/2004 |
| JP | 2007533044 | 11/2007 |
| JP | 2008537615 | 9/2008 |
| JP | 2009116850 | 5/2009 |
| JP | 2009146373 | 7/2009 |
| JP | 2010079791 | 4/2010 |
| JP | 2012520494 | 9/2012 |
| WO | WO03046777 A2 | 6/2003 |
| WO | 2005114369 | 12/2005 |
| WO | 2006094308 | 9/2006 |
| WO | 2011122347 A1 | 10/2011 |
| WO | WO2011133301 A1 | 10/2011 |
| WO | WO2012054350 | 4/2012 |
| WO | WO2012054353 | 4/2012 |
| WO | WO2012054354 | 4/2012 |
| WO | WO2012054355 | 4/2012 |
| WO | WO2012054357 | 4/2012 |
| WO | WO2012054358 | 4/2012 |
| WO | WO2012054359 | 4/2012 |
| WO | 2013162971 | 10/2013 |

OTHER PUBLICATIONS

US Office Action issued in U.S. Appl. No. 13/271,065 dates Apr. 11, 2013.
US Office Action dated Apr. 2, 2013 Issued in U.S. Appl. No. 13/271,057.
US Office Action dated Aug. 23, 2013 from U.S. Appl. No. 12/763,025.
US Office Action dated Aug. 5, 2013 from U.S. Appl. No. 13/271,057.
US Office Action dated Aug. 15, 2013 from U.S. Appl. No. 13/271,065.
US Office Action dated Jul. 12, 2013 from U.S. Appl. No. 13/271,039.
Co-pending U.S. Appl. No. 12/975,025, filed Dec. 21, 2010.
International Search Report and Written Opinion—PCT/US2011/056436—ISA/EPO—Feb. 28, 2012.
International Search Report and Written Opinion—PCT/US2011/056443—ISA/EPO—Feb. 28, 2012.
International Search Report and Written Opinion—PCT/US2011/056445—ISA/EPO—Feb. 28, 2012.
International Search Report and Written Opinion—PCT/US2011/056454—ISA/EPO—Feb. 28, 2012.
International Search Report and Written Opinion—PCT/US2011/056461—ISA/EPO—Feb. 28, 2012.
International Search Report and Written Opinion—PCT/US2011/056462—ISA/EPO—Feb. 28, 2012.
International Search Report and Written Opinion—PCT/US2011/056464—ISA/EPO—Feb. 28, 2012.
International Search Report and Written Opinion, dated May 25, 2011, from Application No. PCT/US2011/030558.
U.S. Appl. No. 61/394,054, filed Oct. 18, 2010 Entitled "Combination Touch Handwriting and Fingerprint Sensor".
International Preliminary Report on Patentability—PCT/US2011/030558, The International Bureau of WIPO—Geneva, Switzerland, Jul. 26, 2012.
International Preliminary Report on Patentability—PCT/US2011/056436, The International Bureau of WIPO—Geneva, Switzerland, Oct. 18, 2012.
International Preliminary Report on Patentability—PCT/US2011/056443, The International Bureau of WIPO—Geneva, Switzerland, Oct. 17, 2012.
International Preliminary Report on Patentability—PCT/US2011/056445, The International Bureau of WIPO—Geneva, Switzerland, Oct. 18, 2012.
International Preliminary Report on Patentability—PCT/US2011/056462, The International Bureau of WIPO—Geneva, Switzerland, Oct. 24, 2012.
International Preliminary Report on Patentability—PCT/US2011/056454, The International Bureau of WIPO—Geneva, Switzerland, Oct. 24, 2012.
International Preliminary Report on Patentability—PCT/US2011/056461, The International Bureau of WIPO—Geneva, Switzerland, Oct. 18, 2012.
International Preliminary Report on Patentability—PCT/US2011/056464, The International Bureau of WIPO—Geneva, Switzerland, Oct. 24, 2012.
Written Opinion of the International Preliminary Examining Authority dated May 22, 2012, from Application No. PCT/US2011/030558.
US Office Action dated Oct. 11, 2013 issued in U.S. Appl. No. 13/271,049.
US Final Office Action dated Apr. 25, 2014 issued in U.S. Appl. No. 13/271,049.
US Notice of Allowance Action dated Jul. 7, 2014 issued in U.S. Appl. No. 13/271,049.
US Notice of Allowance Action dated Oct. 23, 2014 issued in U.S. Appl. No. 13/271,049.
US Notice of Allowance Action dated Aug. 27, 2014 issued in U.S. Appl. No. 13/271,054.
US Notice of Allowance dated Feb. 6, 2014 issued in U.S. Appl. No. 13/271,057.
US Notice of Allowance dated May 23, 2014 issued in U.S. Appl. No. 13/271,057.
US Notice of Allowance dated Jul. 21, 2014 issued in U.S. Appl. No. 13/271,057.
US Notice of Allowance dated Nov. 5, 2014 issued in U.S. Appl. No. 13/271,057.
US Office Action dated May 9, 2014 issued in U.S. Appl. No. 13/271,063.
US Notice of Allowance dated Feb. 28, 2014 issued in U.S. Appl. No. 13/271,065.
US Office Action dated May 23, 2014 issued in U.S. Appl. No. 13/271,069.
US Notice of Allowance dated Oct. 17, 2014 issued in U.S. Appl. No. 13/271,069.
US Notice of Allowance dated Dec. 13, 2013 issued in U.S. Appl. No. 13/271,039.
US Notice of Allowance dated Jan. 31, 2014 issued in U.S. Appl. No. 13/271,039.
US Final Office Action dated Nov. 20, 2014 issued in U.S. Appl. No. 13/271,063, 28 pages.

* cited by examiner

| | Common Voltages | | | | |
|---|---|---|---|---|---|
| Segment Voltages | | $VC_{ADD\_H}$ | $VC_{HOLD\_H}$ | $VC_{REL}$ | $VC_{HOLD\_L}$ | $VC_{ADD\_L}$ |
| | $VS_H$ | Stable | Stable | Relax | Stable | Actuate |
| | $VS_L$ | Actuate | Stable | Relax | Stable | Stable |

TOUCHSCREEN WITH BRIDGED FORCE-SENSITIVE RESISTORS

TECHNICAL FIELD

This disclosure relates to display devices, including but not limited to display devices that incorporate touch screens.

DESCRIPTION OF THE RELATED TECHNOLOGY

Electromechanical systems (EMS) include devices having electrical and mechanical elements, actuators, transducers, sensors, optical components (e.g., mirrors) and electronics. EMS can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). As used herein, the term IMOD or interferometric light modulator refers to a device that selectively absorbs and/or reflects light using the principles of optical interference. In some implementations, an IMOD may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the IMOD. IMOD devices have a wide range of applications, and are anticipated to be used in improving existing products and creating new products, especially those with display capabilities.

Successful touchscreen implementations for multi-touch applications, which may use bare fingers for touch input, balance metrics including detection of every touch by every finger (up to 10 independent touches in some implementations), optical performance (including degradation of the image quality of the underlying display in terms of overall transmission as well as optical artifacts), power consumption, refresh rate, mechanical robustness, zero activation force, palm rejection, linearity and resolution. In most cases, the touchscreen is placed between a display and the user, which necessitates a substantially transparent and optically defect-free sensor. The type of touchscreen that is widely used for multi-touch applications, projected capacitive touch (PCT) technology, generally fulfills the aforementioned criteria.

However, PCT technology is not fully satisfactory for stylus applications, which often use a small-diameter stylus tip for input. The stylus tip may be on the order of 1 mm in diameter. Stylus applications require detection of all stylus touches on the user interface by a 1 mm stylus with higher spatial resolution (on the order of ~0.5 mm) and a non-zero activation force, and may additionally require compatibility with conductive and non-conductive tipped styli. It is doubtful that PCT could extend its capability to significantly higher resolutions, such as ~0.05 mm, were they to be required for future applications such as fingerprint detection.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus which includes a touch sensor. The touch sensor may include a digital resistive touch (DRT) sensor architecture that is substantially free of air gaps. The DRT touch sensor may include a layer of force-sensitive resistor (FSR) material on an array of row and column electrodes. The electrodes may be formed on a substantially transparent substrate. At the intersection of each row and column, a thin transparent patterned conductive bridge may be situated above the FSR. The conductive bridges may be configured for electrical connection with row and column electrodes when force is applied to the conductive bridge or surface of the touch sensor. Some touch sensors may include both DRT and PCT functionality.

Another innovative aspect of the subject matter described in this disclosure can be implemented in a touch sensor apparatus that includes a substrate, a plurality of first electrodes disposed on the substrate, a dielectric layer disposed on the plurality of first electrodes, a plurality of second electrodes disposed on the dielectric layer, a plurality of intermediate conductors disposed on the dielectric layer and configured for electrical communication with the first electrodes through vias formed in the dielectric layer, a layer of FSR material disposed on the second electrodes and the intermediate conductors and a plurality of conductive bridges disposed on the FSR material. Each of the conductive bridges may be disposed above at least one of the intermediate conductors. The FSR material may be configured to form at least one substantially vertical electrical connection between one of the conductive bridges, one of the second electrodes, and one of the intermediate conductors when a force is applied to the FSR material. The apparatus may include a fixed resistor disposed between one of the intermediate conductors and one of the first electrodes.

In some implementations, the substrate may substantially transparent. However, in other implementations, the substrate may be translucent or opaque.

The conductive bridges may be formed into at least one of islands, segmented strips, curvilinear stripes, curvilinear segments, diamond shapes, hollowed geometries, or framed geometries. At least some of the conductive bridges may be disposed, at least in part, above one of the second electrodes. However, the apparatus may include an open region between the conductive bridges that at least partially exposes a PCT area of the first electrodes and the second electrodes. The touch sensor apparatus may be configured for enabling the measurement of changes in mutual capacitance between the first electrodes and the second electrodes. At least one of the first electrodes or the second electrodes may include a conductive portion in the exposed PCT area.

The first electrodes, the second electrodes and/or the intermediate conductors may include branches. The branches may be formed into at least one of L-shapes, spirals, or interdigitated shapes. The intermediate conductor branches may be interdigitated with first electrode branches or second electrode branches.

The first electrodes, the intermediate conductors and/or the second electrodes may be formed, at least in part, of a substantially transparent conductive material. However, in some implementations, at least a portion of the first electrodes and/or the second electrodes may be formed of metal. In some implementations, the first electrodes or the second electrodes may include a substantially transparent conductive material and a conductive metal.

The apparatus may include a force-spreading layer disposed above the conductive bridges and the FSR material. In some such implementations, the apparatus may include an additional layer of flexible material.

The apparatus may include conductive adhesive material disposed between the FSR material and at least one of the conductive bridges, the intermediate conductors, the second electrodes, a flexible layer, a dielectric layer and/or a force-spreading layer. The conductive adhesive material may be substantially transparent.

The second electrodes may include row electrodes and column electrodes. The first electrodes may include jumpers configured to form electrical connections along the row electrodes and/or the column electrodes.

The apparatus may include a display and a processor that is configured to communicate with the display. The processor may be configured to process image data. The apparatus also may include a memory device that is configured to communicate with the processor. The apparatus may include a driver circuit configured to send at least one signal to the display and a controller configured to send at least a portion of the image data to the driver circuit. The apparatus also may include an image source module configured to send the image data to the processor. The image source module may include a receiver, a transceiver and/or a transmitter.

The apparatus may include an input device configured to receive input data and to communicate the input data to the processor. The apparatus also may include a touch controller configured for communication with the processor and routing wires configured for connecting at least one of the first electrodes or the second electrodes to the touch controller.

Another innovative aspect of the subject matter described in this disclosure can be implemented in a method of fabricating a touch sensor apparatus. The method may involve forming a plurality of first electrodes on a substrate, forming a dielectric layer on the plurality of first electrodes and forming vias in the dielectric layer. The method also may involve forming a plurality of second electrodes on the dielectric layer and forming a plurality of intermediate conductors on the dielectric layer. The intermediate conductors may be configured for electrical communication with the first electrodes through the vias.

The method may involve disposing a layer of anisotropic FSR material on the second electrodes and the intermediate conductors and forming a plurality of conductive bridges on the FSR material. Each of the conductive bridges may be disposed above at least one of the intermediate conductors. The FSR material may be configured to form at least one substantially vertical electrical connection between one of the conductive bridges, one of the second electrodes and one of the intermediate conductors when a force is applied to the FSR material. The method also may involve disposing a fixed resistor between one of the intermediate conductors and one of the first electrodes.

The method may involve forming some of the conductive bridges to extend above at least one of the second electrodes. However, an open region may be formed between the conductive bridges that at least partially exposes a PCT area of the first electrodes and the second electrodes. The method also may involve configuring the touch sensor apparatus for measuring changes in mutual capacitance between the first electrodes and the second electrodes. The first electrodes and/or the second electrodes may include a conductive portion in the exposed PCT area. The conductive portion may be formed, at least in part, of a conductive metal.

The apparatus also may include a display and a processor that is configured to communicate with the display. The processor may be configured to process image data. The apparatus also may include a memory device that is configured to communicate with the processor. The apparatus may include a driver circuit configured to send at least one signal to the display and a controller configured to send at least a portion of the image data to the driver circuit. The apparatus may include an image source module configured to send the image data to the processor. The image source module may include at least one of a receiver, transceiver, and transmitter. The apparatus may include an input device configured to receive input data and to communicate the input data to the processor. The apparatus may include a touch controller configured for communication with the processor and routing wires configured for connecting touch sensor electrodes with the touch controller.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCD), organic light-emitting diode (OLED) displays, electrophoretic displays, and field emission displays. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
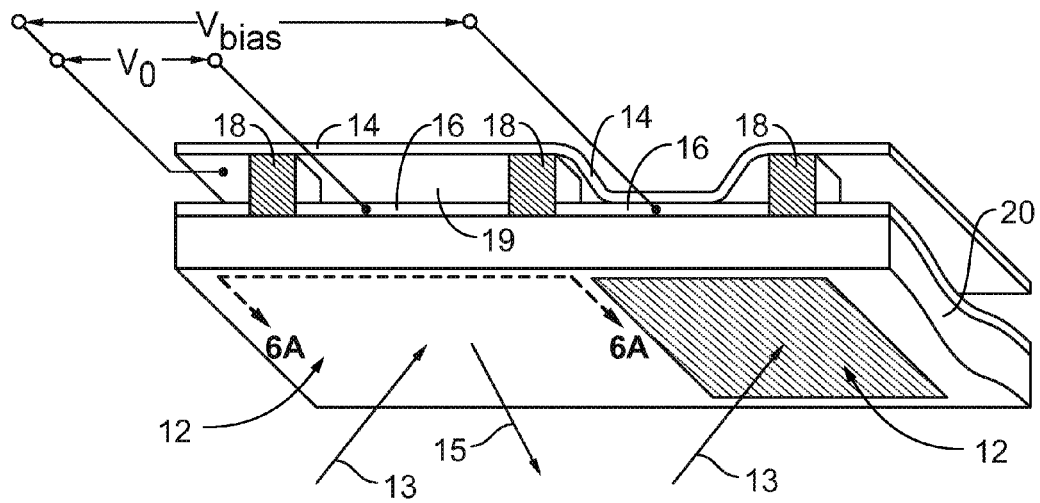
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

According to some implementations provided herein, a touch sensor may include a DRT sensor architecture that is substantially free of air gaps. The DRT touch sensor may include a layer of FSR material on an array of row and column electrodes. The electrodes may be formed on a substantially transparent substrate. At the intersection of each row and column, a thin transparent patterned conductive bridge may be situated above the FSR. The bridge may be configured for electrical connection with a row electrode and a column electrode when force is applied to the conductive bridge or surface of the touch sensor. Some implementations may include a fixed resistor between an intermediate conductor and a row electrode. Some touch sensor implementations may include exposed projected capacitive touch areas of the row and column electrodes. The touch sensor may include a flexible layer and/or a force-spreading layer disposed on the conductive bridge and portions of the FSR layer. In some implementations, the DRT aspect of the bridged FSR touch sensor can allow detection of stylus tips pressed against the sensor for handwriting input, while the PCT aspect can allow detection of light touches or close proximity from a swoop or swipe of a finger.

Particular implementations of the subject matter described in this disclosure can be implemented to realize one or more of the following potential advantages. Some touch sensor implementations achieve high spatial resolution and detect stylus input regardless of the location of the stylus on the touch sensor. Some implementations mitigate image quality issues, such as transparency and optical artifacts. Some implementations may relax alignment tolerances between patterned laminated layers and a patterned substrate. For example, conductive bridges arranged as islands that are small with respect to the distance between adjacent rows or columns allow a wide range of alignment positions and orientations.

Some implementations provide only DRT sensing, whereas other implementations can provide both projected capacitive touch (PCT) and DRT sensing. PCT capability for detecting light touches may be realized by ensuring that some portions of the row and/or column electrodes extend beyond the conductive bridge.

To minimize crosstalk between adjacent sensing elements, the FSR material may be electrically anisotropic, having very low conduction laterally (under substantially all conditions) and high conduction vertically (when subject to mechanical force). One or more protective, substantially flexible and substantially transparent layers can be positioned above the FSR layer not only for protection, but also to spread the force of the contact over a larger area in order to enhance detection. To aid in differentiating multiple simultaneous touches or stylus contacts, a fixed resistor in series with the FSR material may be formed at each sensing element or "sensel." Various implementations described herein may be compatible with essentially all display technologies, including but not limited to LCD, OLED, cathode ray tube (CRT), electrophoretic display (EPD) and interferometric modulator (IMOD) and, optionally, displays with either front lighting or back lighting.

An example of a suitable EMS or MEMS device, to which the described implementations may apply, is a reflective display device. Reflective display devices can incorporate IMODs to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the IMOD. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an IMOD display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent IMODs 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the IMOD 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the IMOD 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers.

When no voltage is applied, the movable reflective layer 14 remains in a mechanically relaxed state, as illustrated by the IMOD 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated IMOD 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
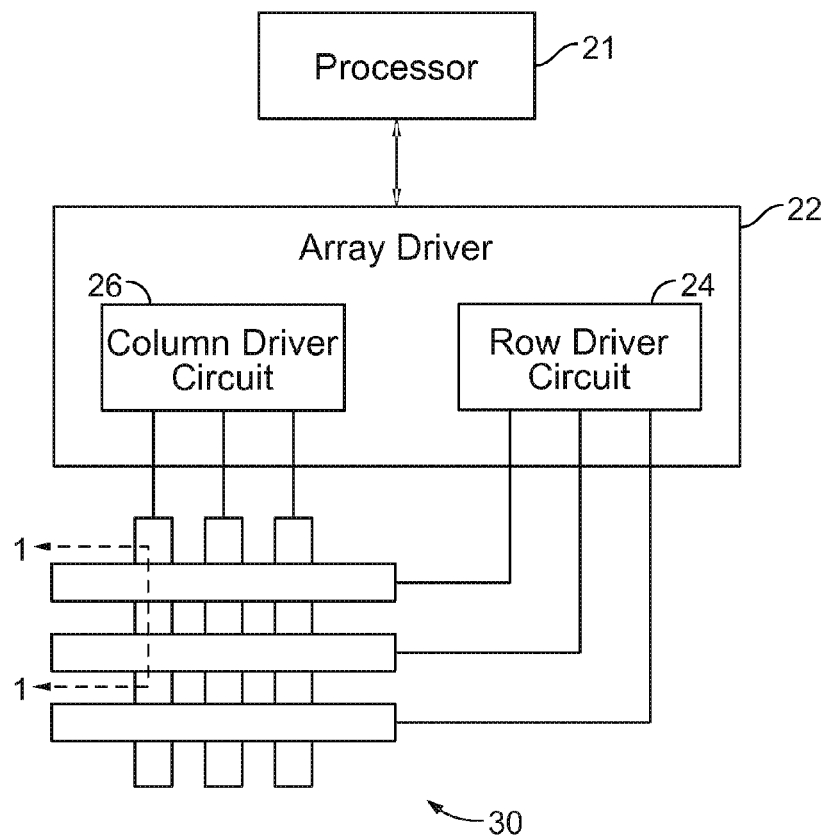
FIG. 2 shows an example of a system block diagram illustrating an electronic device incorporating a 3×3 IMOD display.

FIG. 2 shows an example of a system block diagram illustrating an electronic device incorporating a 3×3 IMOD display. The electronic device includes a processor 21 that may be configured to execute one or more software modules. In addition to executing an operating system, the processor 21 may be configured to execute one or more software applications, including a web browser, a telephone application, an email program, or other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
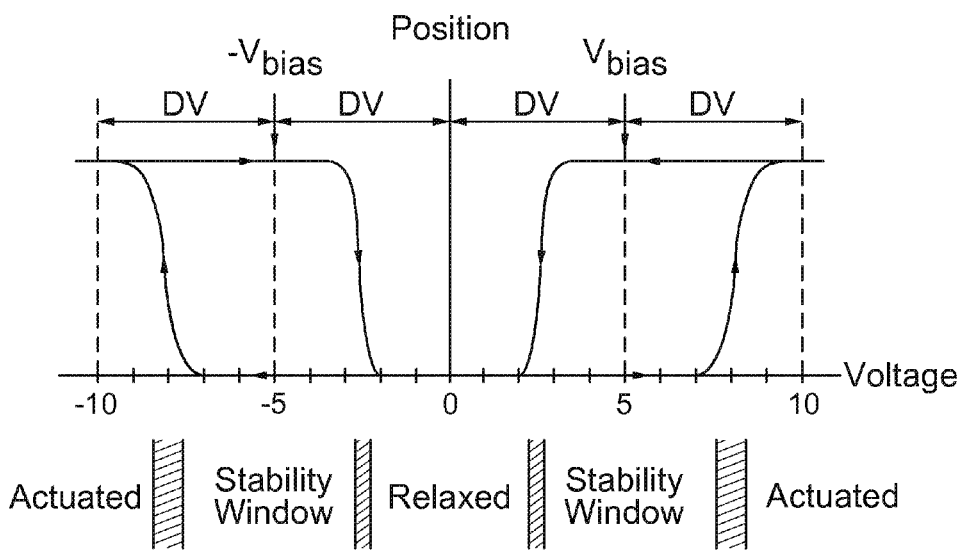
FIG. 3 shows an example of a diagram illustrating movable reflective layer position versus applied voltage for the IMOD of FIG. 1.
FIG. 4 shows an example of a table illustrating various states of an IMOD when various common and segment voltages are applied.

FIG. 3 shows an example of a diagram illustrating movable reflective layer position versus applied voltage for the IMOD of FIG. 1. For MEMS IMODs, the row/column (i.e., common/segment) write procedure may take advantage of a hysteresis property of these devices as illustrated in FIG. 3. An IMOD may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10 volts. However, the movable reflective layer does not relax completely until the voltage drops below 2 volts. Thus, a range of voltage, approximately 3 to 7 volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10 volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7 volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an IMOD when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all IMOD elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the IMOD will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
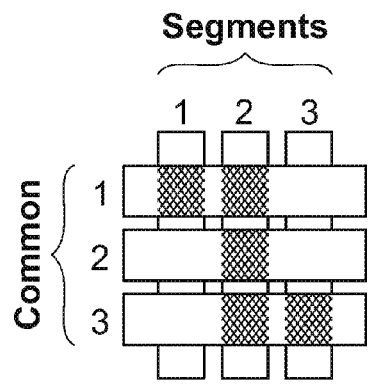
FIG. 5A shows an example of a diagram illustrating a frame of display data in the 3×3 IMOD display of FIG. 2.
Figure 5B:
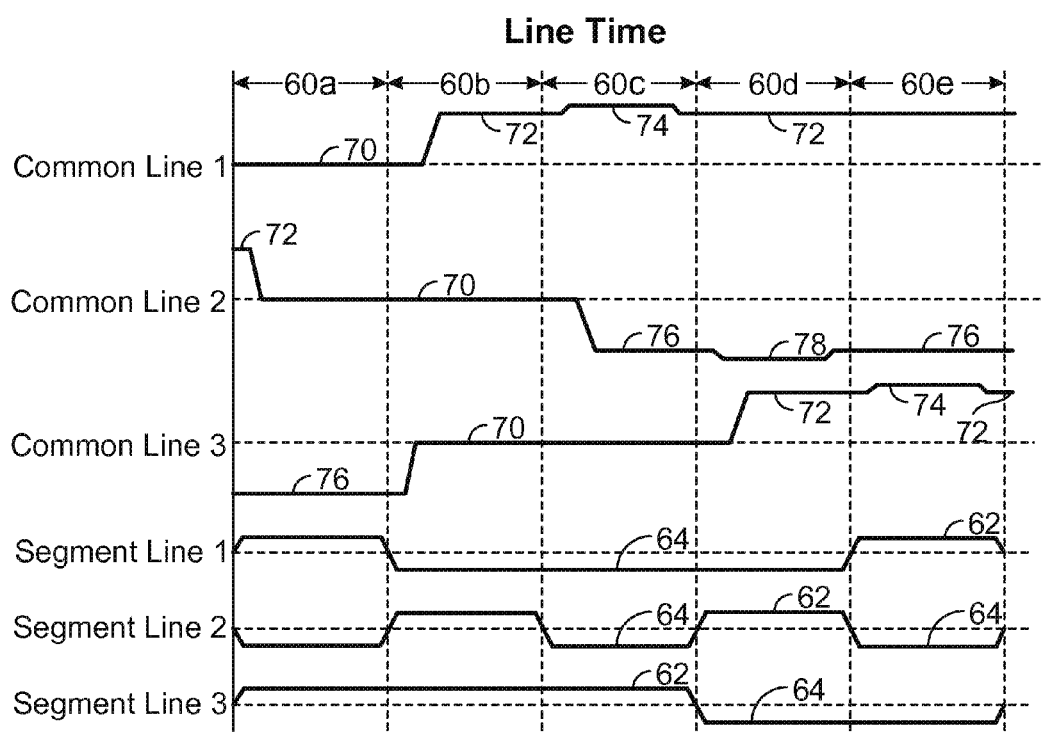
FIG. 5B shows an example of a timing diagram for common and segment signals that may be used to write the frame of display data illustrated in FIG. 5A.

FIG. 5A shows an example of a diagram illustrating a frame of display data in the 3×3 IMOD display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a, a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the IMODs, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
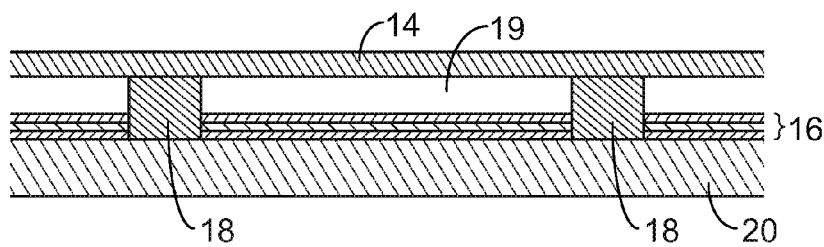
FIG. 6A shows an example of a partial cross-section of the IMOD display of FIG. 1.
Figure 6B:
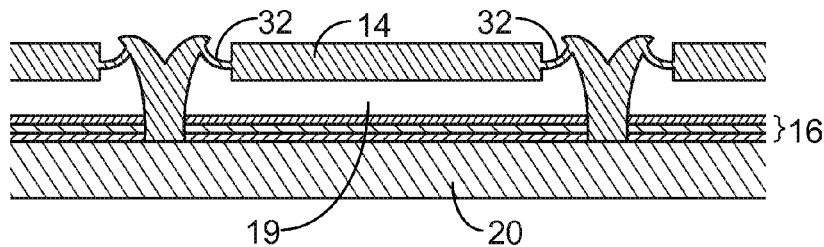
FIGS. 6B-6E show examples of cross-sections of varying implementations of IMODs.
Figure 6C:
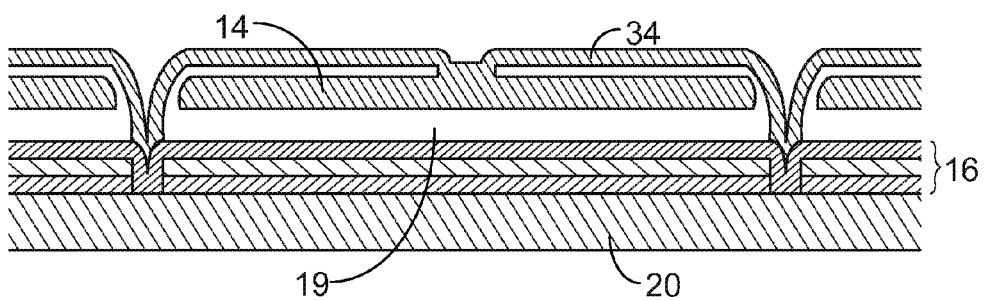

The details of the structure of IMODs that operate in accordance with the principles set forth above may vary widely. For example, FIGS. 6A-6E show examples of cross-sections of varying implementations of IMODs, including the movable reflective layer 14 and its supporting structures. FIG. 6A shows an example of a partial cross-section of the IMOD display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
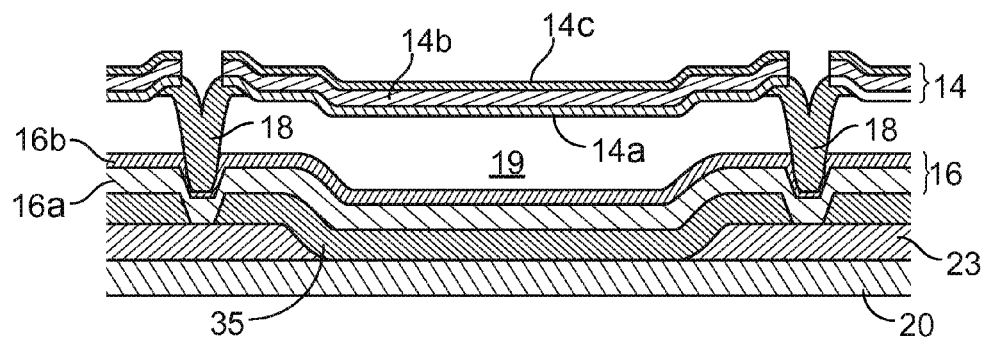

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, an $SiO_2/SiON/SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
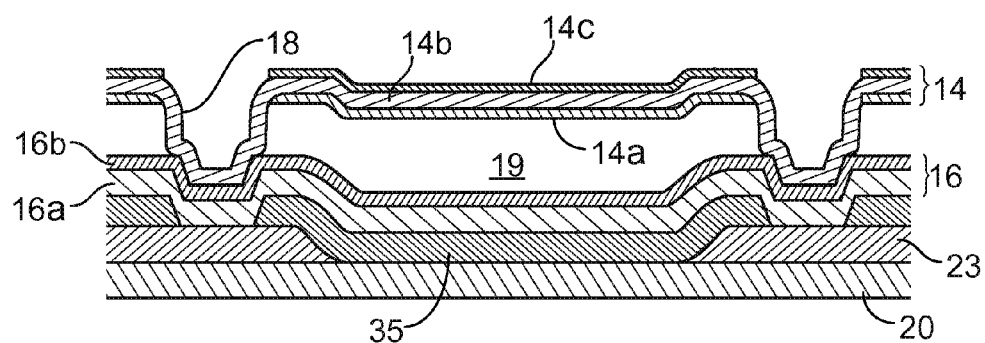

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the IMOD is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
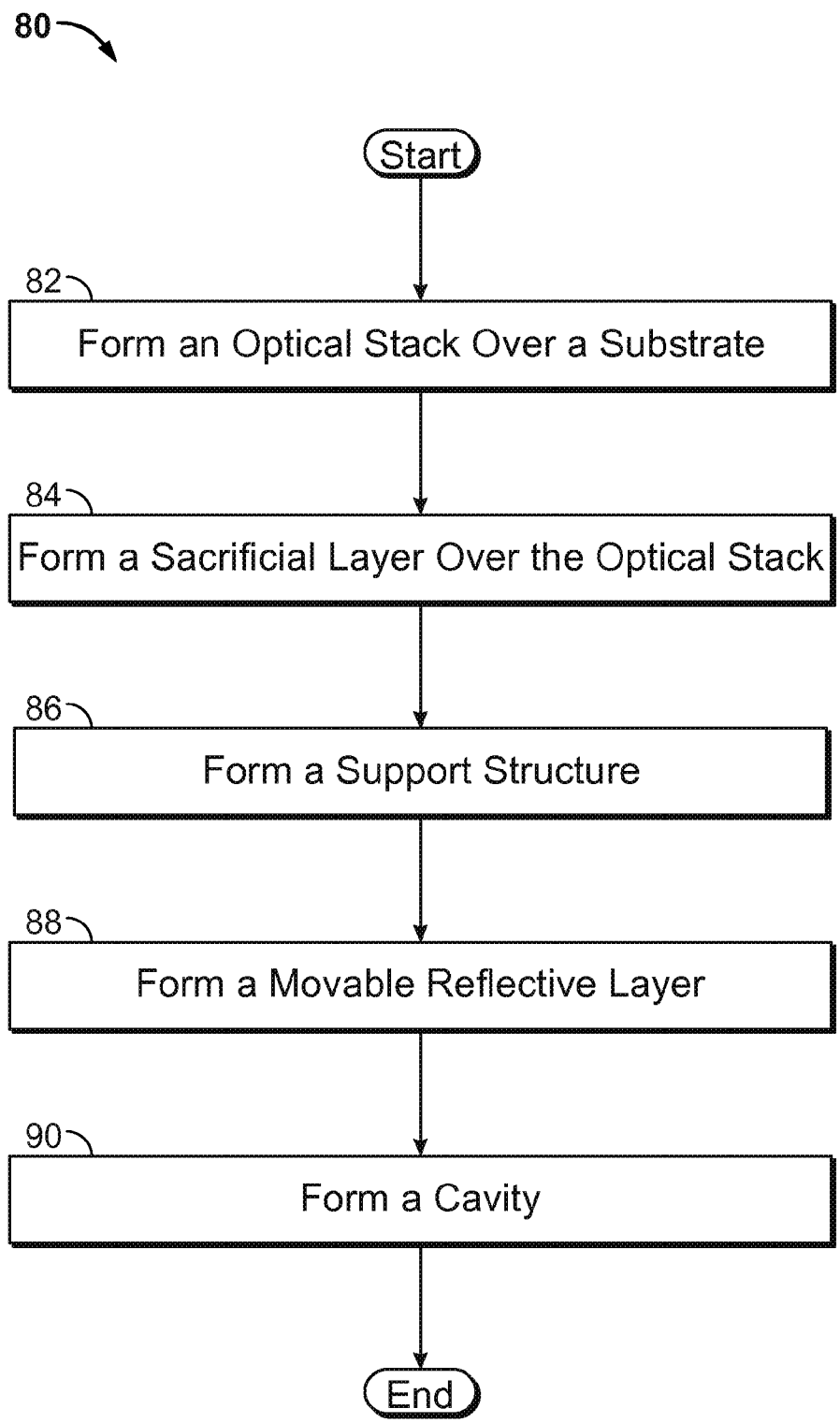
FIG. 7 shows an example of a flow diagram illustrating a manufacturing process for an IMOD.
Figure 8A:
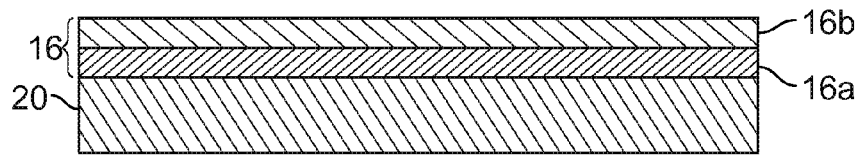
FIGS. 8A-8E show examples of cross-sectional schematic illustrations of various stages in a method of making an IMOD.

FIG. 7 shows an example of a flow diagram illustrating a manufacturing process 80 for an IMOD, and FIGS. 8A-8E show examples of cross-sectional schematic illustrations of corresponding stages of such a manufacturing process 80. In some implementations, the manufacturing process 80 can be implemented to manufacture, e.g., IMODs of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
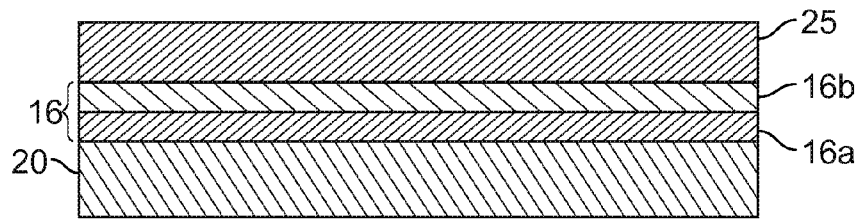

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting IMODs 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
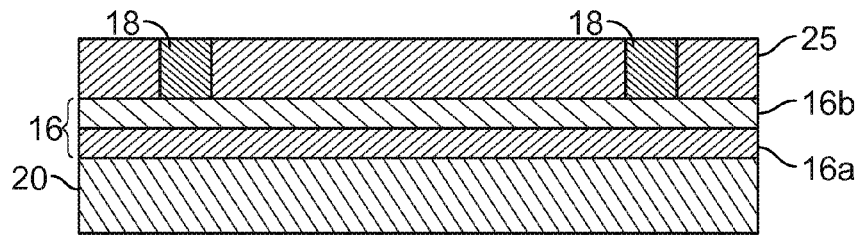

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
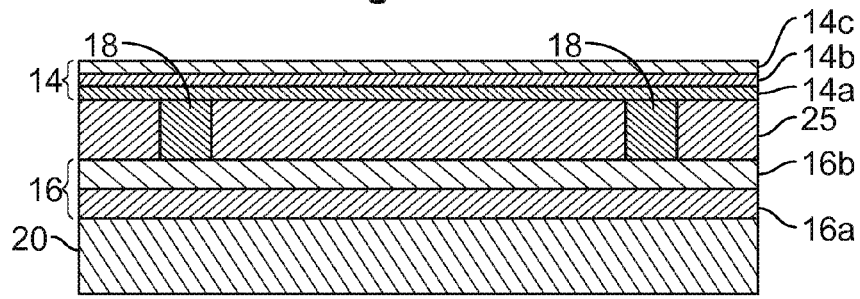
Figure 8E:
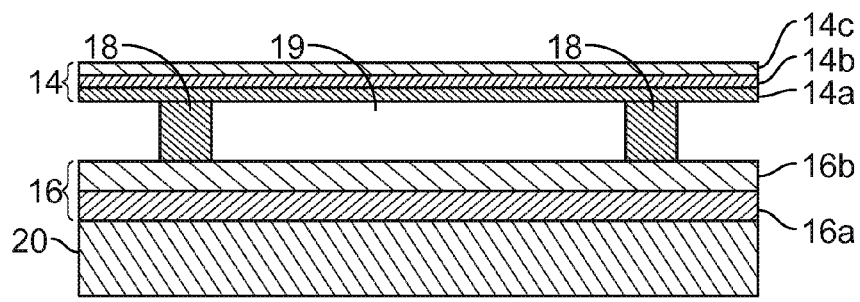

The process 80 continues at block 88 with the formation of a movable reflective layer or membrane such as the movable reflective layer 14 illustrated in FIGS. 1, 6 and 8D. The movable reflective layer 14 may be formed by employing one or more deposition processes, e.g., reflective layer (e.g., aluminum, aluminum alloy) deposition, along with one or more patterning, masking, and/or etching processes. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated IMOD formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other combinations of etchable sacrificial material and etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9:
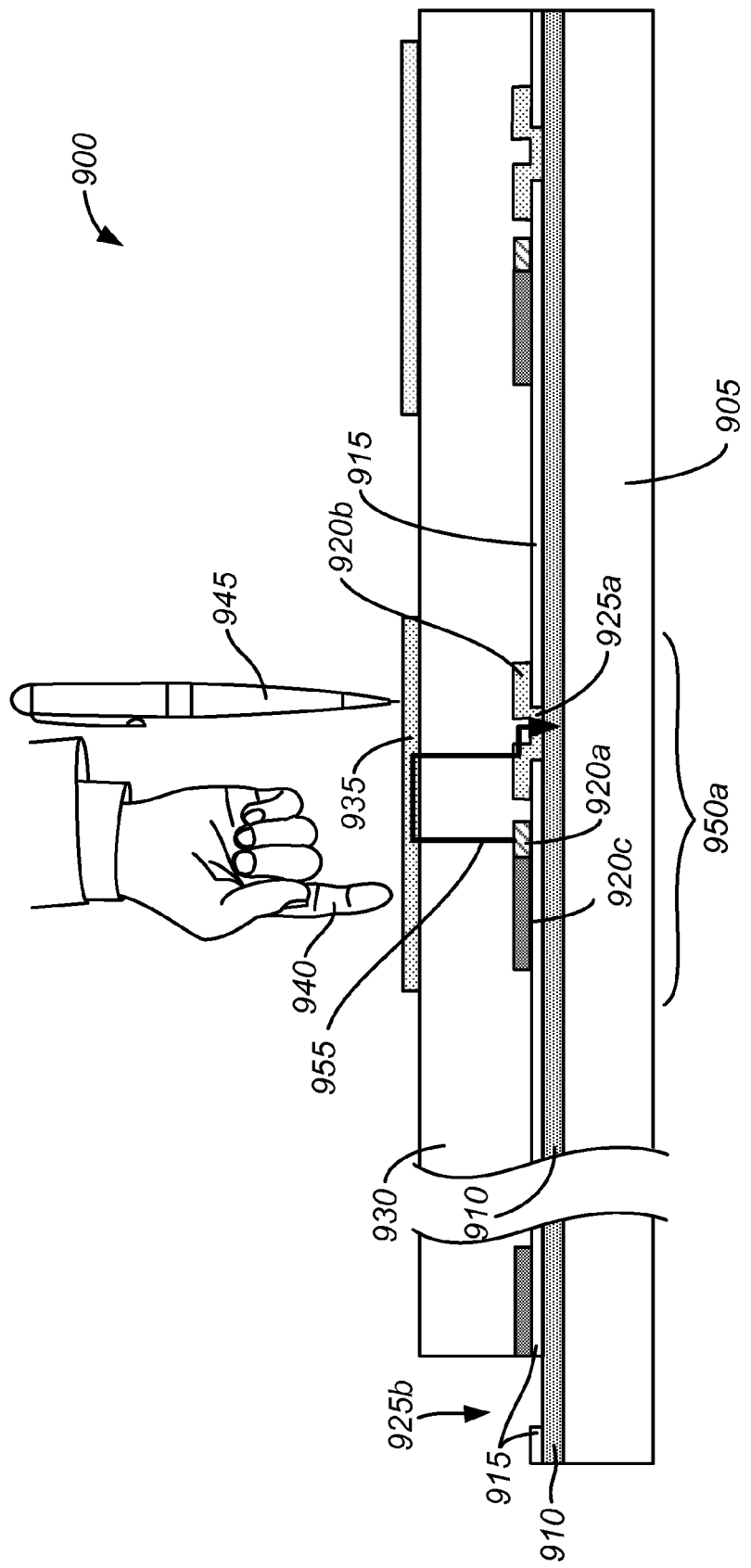
FIG. 9 shows an example of a cross-section through a touch sensor implementation.

FIG. 9 shows an example of a cross-section through a touch sensor implementation. In this example, the touch sensor device 900 includes electrodes 910 formed on a substrate 905. A dielectric layer 915 electrically insulates the electrodes 910 from the electrodes 920c. The intermediate conductors 920b are configured for electrical communication with the electrodes 910 through the vias 925a. In some implementations, optional second intermediate conductors 920a, which can be extensions of the electrodes 920c, are provided. Accordingly, in some implementations there are no separate second intermediate conductors 920a. When a sufficient force is applied to the FSR layer 930 (such as by a finger 940 or a stylus 945), an electrical connection may be made between a conductive bridge 935, one of the intermediate conductors 920b, and either one of the electrodes 920c or one of the second intermediate conductors 920a. In this manner the touch sensor device can provide DRT functionality.

In some implementations, the substrate 905 may be substantially transparent. For example, the substrate 905 may be formed of one or more suitable substantially transparent materials, such as glass, plastic, polymer, etc. In some implementations, the substrate 905 may be a display substrate. For example, in some implementations the substrate 905 may be the same substrate as the transparent substrate 20 described above. In some implementations, the substrate 905 may be a cover glass of a display apparatus. However, the substrate 905 also may be formed, at least in part, of substantially translucent or substantially opaque material. In some implementations, the substrate 905 may include two, three or more layers.

The dielectric layer 915 may include one or more layers of a dielectric material, for example, silicon oxynitride (SiON), silicon dioxide ($SiO_2$), etc. The dielectric layer 915 also may be formed of an organic material, such as an elastomer. In some implementations, the dielectric layer 915 can be a stack of layers, such as, for example, a $SiO_2$/SiON/$SiO_2$ tri-layer stack.

The electrodes 910, the electrodes 920c, the intermediate conductors 920b, the second intermediate conductors 920a, and the conductive bridges 935 (which may be collectively referred to herein as the "conductive elements") may be formed of various suitable conductive materials. In some implementations, at least some of the conductive elements may be formed, at least in part, of a substantially transparent conductive material such as indium tin oxide (ITO) or a transparent conductive film. Some such transparent conductive films may contain conductive nanoparticles, such as silver nanoparticles. Although transparency is a very desirable attribute for some implementations, ITO and other substantially transparent conductive materials have a relatively higher electrical resistance than some conductive metals. The higher resistance of ITO electrodes can cause a relatively slower response time than that of metal electrodes and therefore may cause a slower frame rate, particularly for large touch panels. The higher resistance of the ITO also may require relatively more power for the touch sensor device 900 and wider electrodes. When ITO is used, the conductive elements 910, 920a, 920b and 920c may be on the order of 50 to 200 microns wide.

Some touch sensor devices 900 described herein may include conductive elements that are formed, at least in part, of conductive metal. In some such implementations, the electrodes 910, the electrodes 920c and/or the intermediate conductors 920b, and the second intermediate conductors 920a may be formed, at least in part, of thin (such as around 0.1-5.0 micron thick) conductive metal wires. The conductive elements 910, 920a, 920b and 920c may be on the order of 1-5 microns wide. Some such implementations are described below.

However, whether made from ITO, metal wire or another material, the electrodes 910, the electrodes 920c and/or the intermediate conductors 920b and the second intermediate conductors 920a may not be noticeable to a human observer. In some implementations, these conductive elements may be formed of a metal wire or trace that is too thin to be readily observed. In some implementations, the electrodes 910, the electrodes 920c and/or the intermediate conductors 920b, and the second intermediate conductors 920a may be formed (at least in part) of an optical stack that is configured to reduce and/or minimize the reflection of incident light. In some such implementations, the optical stack may be similar to that of the black mask structure 23 described above. As such, the optical stack may include a molybdenum-chromium (MoCr) layer that serves as an optical absorber, an $SiO_2$ layer, and a conductive metal layer such as an aluminum alloy layer.

Figure 10:
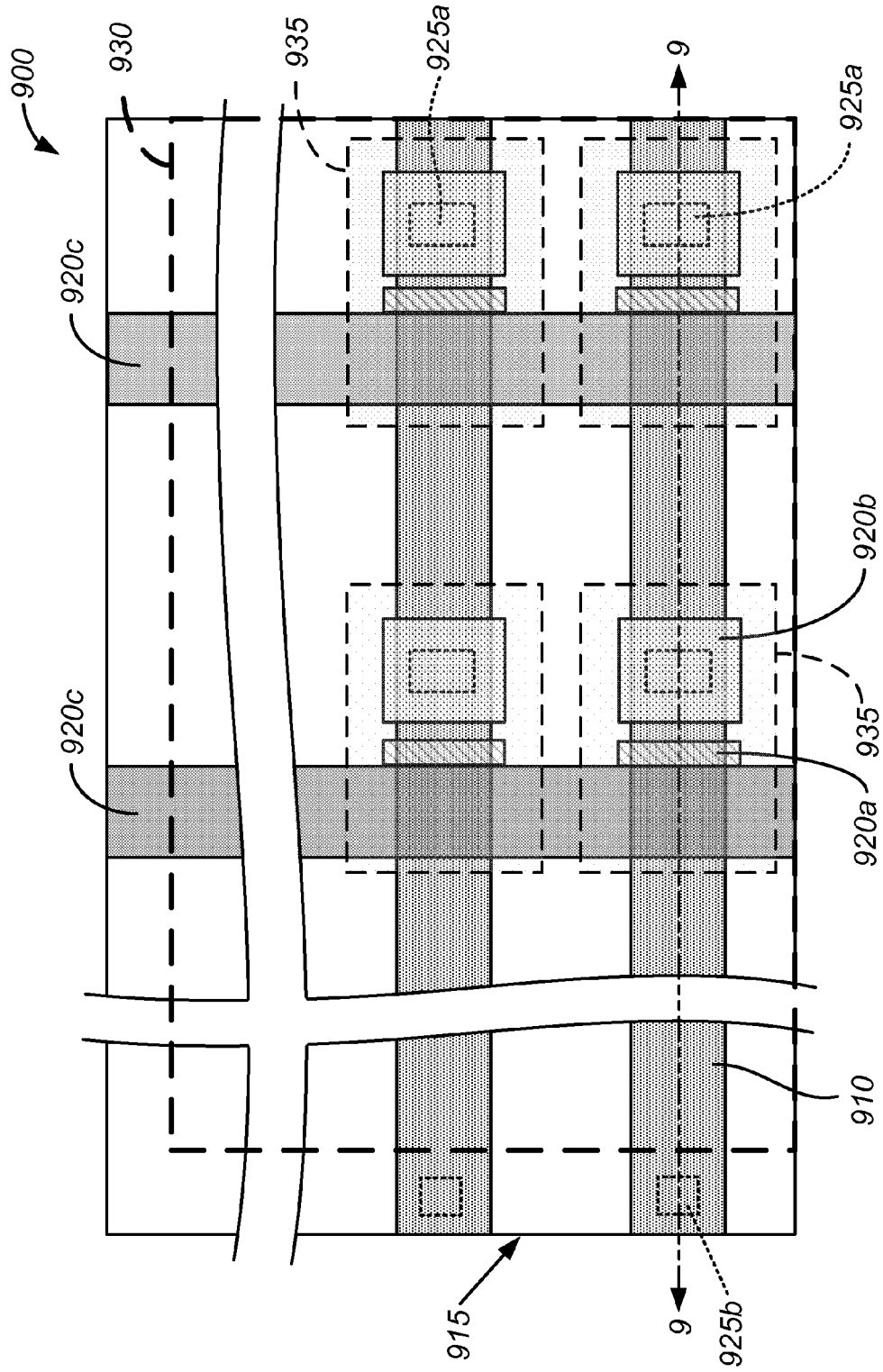
FIG. 10 shows an example of a plan view of a portion of the touch sensor of FIG. 9.

FIG. 10 shows an example of a plan view of a portion of the touch sensor of FIG. 9. Referring now to FIG. 10, it may be seen that the electrodes 910 function as row electrodes and the second intermediate conductors 920a function as column electrodes in this implementation. However, in alternative implementations, the electrodes 910 may function as column electrodes and the electrodes 920c may function as row electrodes. In this example, the intermediate conductors 920b are configured as discontinuous rectangles that overlie portions of the electrodes 910. Alternative configurations of the intermediate conductors 920b and the second intermediate conductors 920a are described below.

The FSR layer 930 may include a patterned or an unpatterned layer of FSR material. The FSR material may include a conductive polymer having a resistance that changes in a predictable manner when force is applied to its surface. The FSR material may be supplied as a polymer sheet or as an ink that can be applied by screen printing, spinning, or other processes. The FSR material may include a sensing film having electrically conductive particles suspended in an insulating matrix. The particles may be less than a micron in size.

In some implementations, the FSR layer 930 may have a thickness on the order of microns, such as in the range of 1-5 microns. In some implementations, the FSR layer 930 may have a thickness of approximately 2 microns. In some implementations, the FSR layer 930 may temporarily increase conductivity in the vertical direction when a force is applied, in which case the material of the FSR layer 930 may be referred to herein as "anisotropic FSR," "anisotropic vertical FSR," or "vertical FSR" material. In some other implementations, the FSR layer 930 may increase conductivity isotropically when a force is applied, in which case the material of the FSR layer 930 may be referred to herein as "isotropic FSR" material. In the example shown in FIG. 9, the FSR layer 930 is formed of anisotropic vertical FSR material.

Within the area in which the FSR layer 930 is disposed, the intermediate conductors 920b are electrically connected to the electrodes 910 through the vias 925a. Outside of the area in which the FSR layer 930 is disposed, electrical connections may be made to the electrodes 910 through the vias 925b. For example, routing wires (not shown) on the periphery of the touch sensor device may be connected to the electrodes 910 through the vias 925b. Such routing wires may readily be connected to the electrodes 920c outside of the area in which the FSR layer 930 is disposed, because the FSR layer 930 is not covering the electrodes 920c in these areas (see also FIG. 9).

The second intermediate conductors 920a and the intermediate conductors 920b may be configured to detect stylus or finger touches with minimal impact on the optical image quality of a display that is viewed through the touch sensor device 900. In some implementations, such detection capabilities may be provided by forming the second intermediate conductors 920a and the intermediate conductors 920b as adjacent and/or interdigitated electrically conducting transparent contact surfaces at a fine pitch (see, e.g., FIGS. 11B and 11C). In some such implementations, the second intermediate conductors 920a and the intermediate conductors 920b may be formed of a thin or locally thin (such as about 25-500 Å), substantially transparent conductive oxide material such as ITO. In some implementations, the electrodes 910 and/or the conductive bridges 935 also may be formed of a substantially transparent conductive material.

In the example shown in FIG. 9, the conductive bridges 935 form discontinuous rectangles that overlie the intermediate conductors 920b and portions of the electrodes 910 and the second intermediate conductors 920a. Alternative configurations of the conductive bridges 935 are described below. In various implementations described herein, each conductive bridge 935 functions as an electrical bridge in an FSR switch of a sensel.

For example, referring to FIG. 9, when a sufficient force is applied to the FSR layer 930 (such as by the finger 940 or the stylus 945), a substantially vertical electrical connection may be made through the FSR layer 930 to the underlying second intermediate conductor 920a of the sensel 950a. Another substantially vertical electrical connection may be made between through the FSR layer 930 to the underlying intermediate conductor 920b, which is configured for electrical connection with one of the electrodes 910. In this implementation, the FSR layer 930 need not become significantly more conductive in the plane of the FSR layer 930 when the force is applied. Accordingly, the conductive bridge 935 provides a horizontal electrical connection and completes the circuit 955 of the sensel 950a.

The conductive bridges 935 may have a relatively high resistance (such as about 0.1-1 Mohm) or a relatively low resistance (e.g., <0.1 Mohm), according to the desired implementation. The conductive bridges 935 may be patterned or unpatterned. If the conductive bridge 935 has a relatively high resistance then it may provide the functionality of a fixed resistor. In some implementations, the conductive material of low-resistance conductive bridges 935 may function as row or column electrodes of the touch sensor device 900.

Figure 11A:
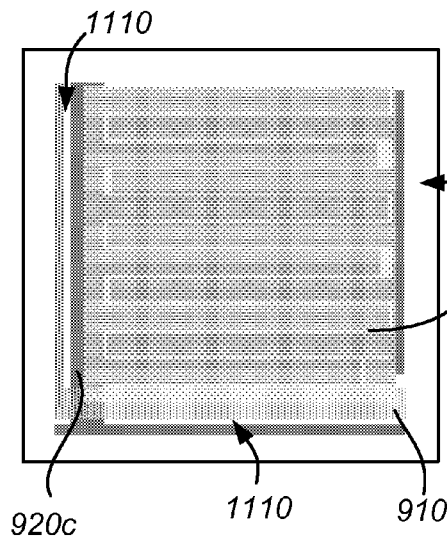
FIGS. 11A-11C show examples of alternative conductive bridge configurations.
Figure 11B:
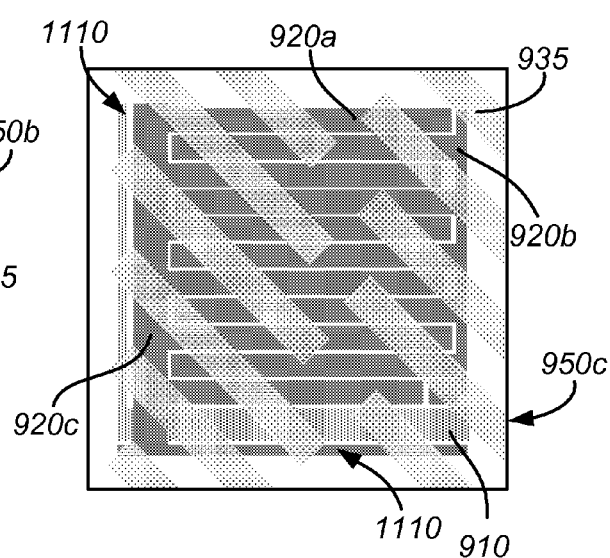
Figure 11C:
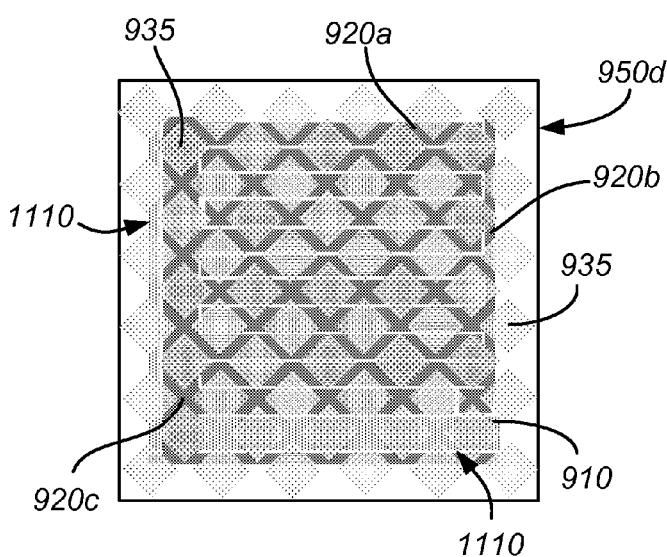

FIGS. 11A-11C show examples of alternative conductive bridge configurations. In FIG. 11A, the conductive bridge 935 is patterned such that it occupies most of the area of the sensel 950b. If the conductive bridge 935 has a low resistance and is unpatterned, then undesirable current paths between adjacent and non-adjacent sensels may reduce system performance (such as the ability to determine the state of all switches). Moreover, the patterning exposes at least a portion of the electrodes 910 and/or the electrodes 920c, which form the projected capacitive touch areas 1110.

Patterning the conductive bridges 935 can reduce the likelihood of crosstalk between sensels and allow external electric fields to reach the PCT electrodes connected to electrodes 910 and 920c with minimal reduction of the ability of the sensel to detect DRT input. Therefore, in some implementations of the touch sensor device 900, the conductive bridges 935 within a sensel may be patterned into various shapes. In the example shown in FIG. 11B, the conductive bridges 935 of the sensel 950c have been formed into isolated rectangular shapes that may be slanted to overlap portions of second intermediate conductors 920a and intermediate conductors 920b. In this example, a substantial portion of the intermediate conductors 920b and the second intermediate conductors 920a may be seen between the isolated rectangular shapes of the conductive bridges 935. As compared to the sensel 950b of FIG. 11A, the projected capacitive touch areas 1110, in which at least a portion of the electrodes 910 and/or the electrodes 920c are exposed, occupy a substantially larger percentage of the area of the sensel 950c. The projected capacitive touch areas 1110 may include adjacent regions between intermediate conductors 920a and 920b.

In the example shown in FIG. 11C, the conductive bridges 935 of the sensel 950d have been formed into isolated diamond shapes. As compared to the sensel 950b of FIG. 11A, the projected capacitive touch areas 1110 occupy a substantially larger percentage of the area of the sensel 950d. In some alternative implementations, the conductive bridges 935 may be configured as segmented strips, curvilinear stripes, curvilinear segments, or hollowed or framed geometries. In some alternative implementations, the conductive bridges 935 may provide the functionality of row or column electrodes and may be patterned accordingly.

Figure 12A:
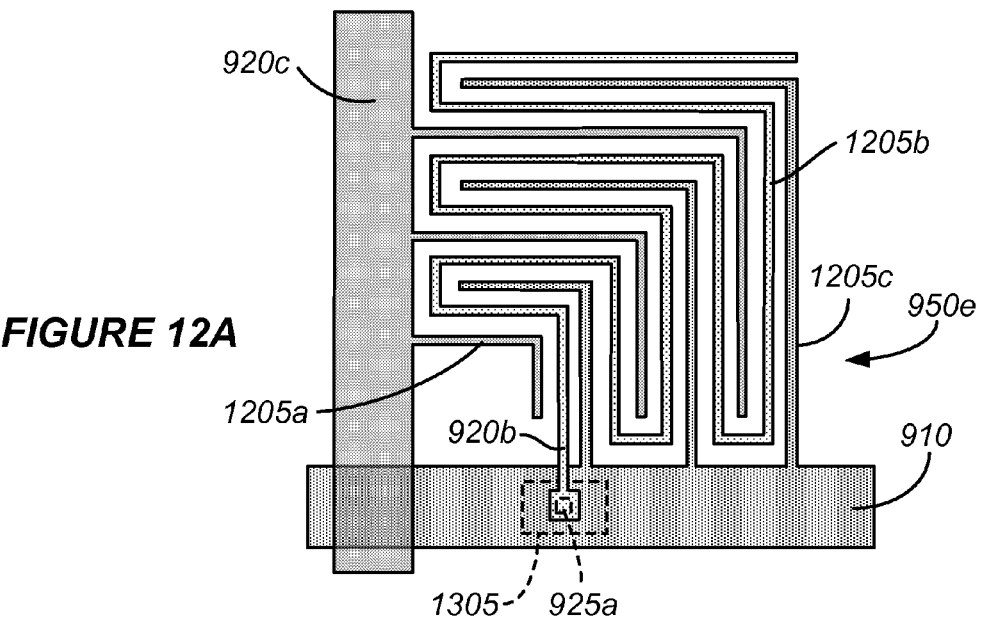
FIGS. 12A-12C show examples of alternative intermediate conductor configurations.
Figure 12B:
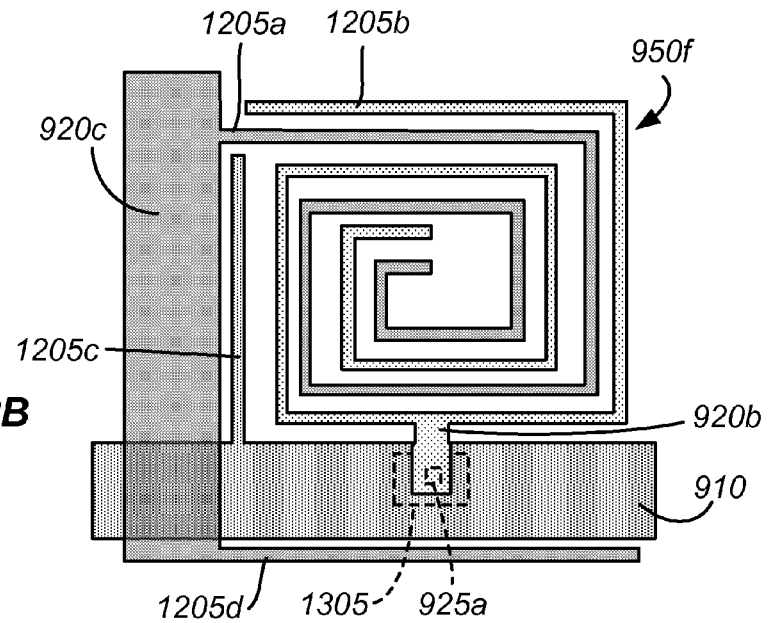
Figure 12C:
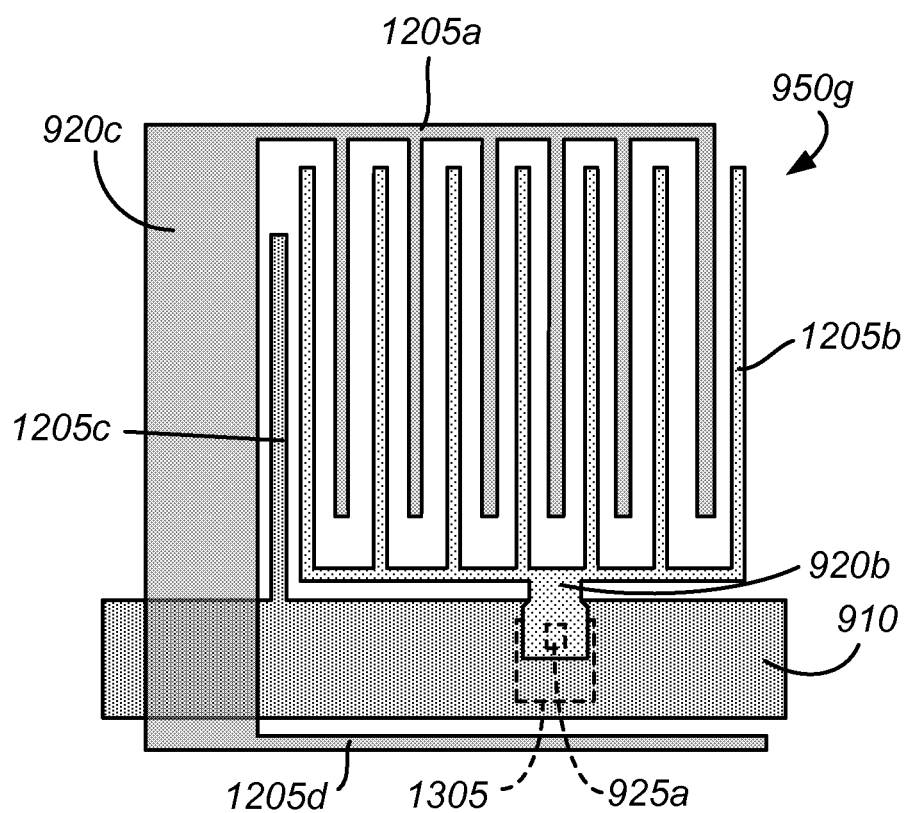

FIGS. 12A-12C show examples of alternative intermediate conductor configurations. Referring first to FIG. 12A, the sensel 950e includes an electrode 920c having one or more L-shaped branches 1205a. The electrode 910 has one or more L-shaped branches 1205c. The intermediate conductor 920b includes the branch 1205b, which is disposed between the L-shaped branches 1205a and the L-shaped branches 1205c. The intermediate conductor 920b can be electrically connected to the electrode 910 through a fixed resistor 1305, which is partially formed in a via hole through the dielectric layer 915 (see FIG. 13). In some implementations, there is no fixed resistor 1305 and the intermediate conductor 920b is electrically connected to the electrode 910 through the via 925a.

In FIG. 12B, the sensel 950f includes an electrode 920c having a spiral-shaped branch 1205a. The electrode 910 may have a branch 1205c that is disposed substantially parallel to the electrode 920c. The intermediate conductor 920b has a spiral-shaped branch 1205b that is disposed adjacent to the spiral-shaped branch 1205a. The intermediate conductor 920b is electrically connected to the electrode 910 through a fixed resistor 1305. In some implementations, there is no fixed resistor 1305 and the intermediate conductor 920b is electrically connected to the electrode 910 through the via 925a. The electrode 920c may also have a branch 1205d that is disposed substantially parallel to the electrode 910.

In FIG. 12C, the sensel 950g includes an electrode 920c having comb-shaped branches 1205a. The intermediate conductor 920b has comb-shaped branches 1205b that are interdigitated with the comb-shaped branches 1205a. Like the sensel 950f, the sensel 950g may include an electrode 920c having a branch 1205d that is disposed substantially parallel to the electrode 910 and may also include an electrode 910 having a branch 1205c that is disposed substantially parallel to the electrode 920c. The branches 1205c and 1205d and similar features (not shown) may increase the PCT sensitivity to touches or proximity of a finger.

Figure 13:
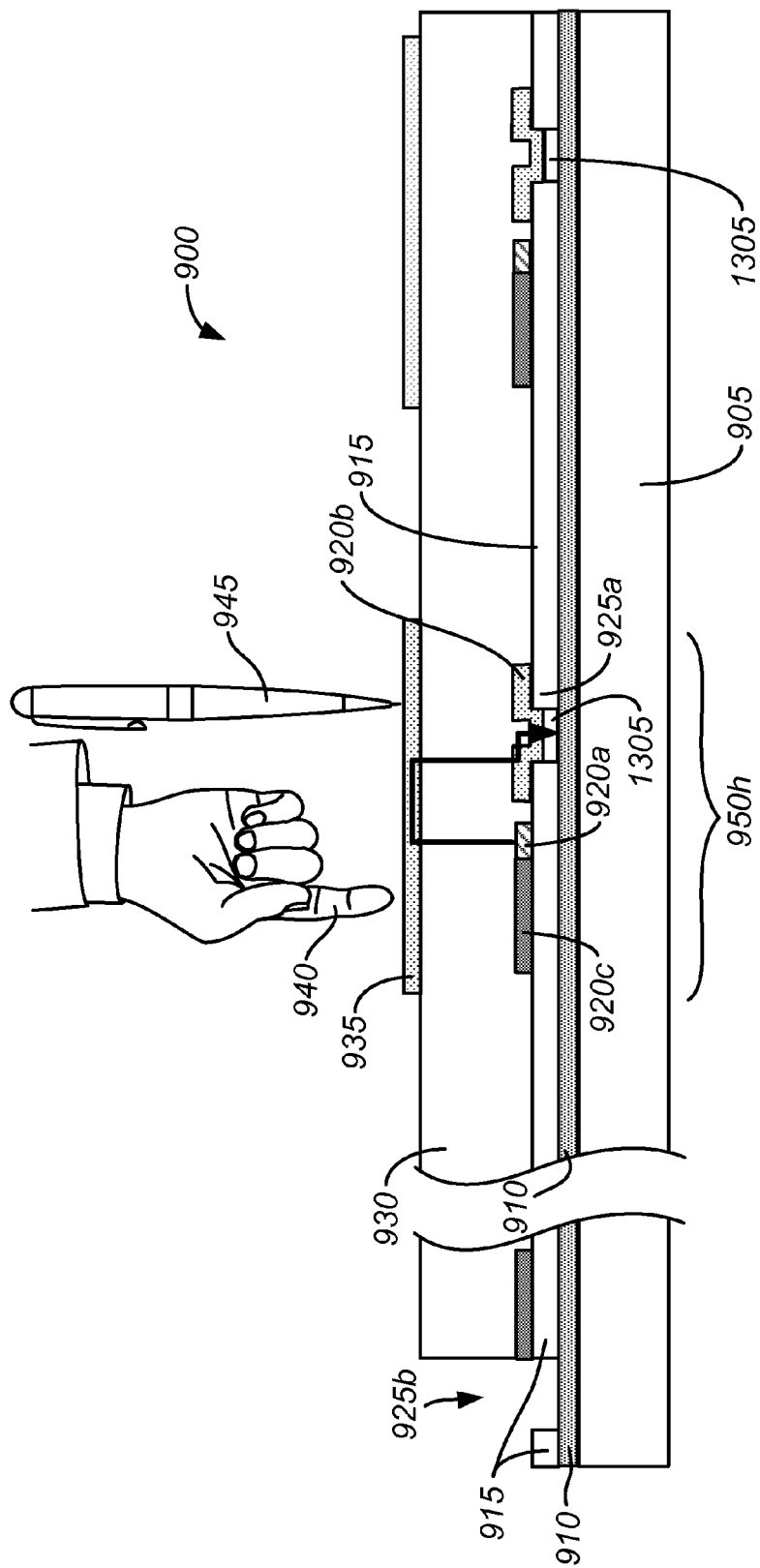
FIG. 13 shows an example of a cross-section through a touch sensor that includes a fixed resistor between an intermediate conductor and an electrode.

FIG. 13 shows an example of a cross-section through a touch sensor that includes a fixed resistor between an intermediate conductor and an electrode. This implementation of the touch sensor device 900 is substantially similar to the implementation depicted in FIG. 9 and described above. However, this implementation includes a fixed resistor 1305 disposed in the via 925a between the intermediate conductor 920b and the electrode 910.

In this example, the fixed resistor 1305 has a relatively large resistance (such as in the range of about 0.01 to 10 Mohm), as compared to that of the intermediate conductors 920b. The material used to form the fixed resistors 1305 may have a high sheet resistivity, (such as in the range of about 1e3 to 1e7 Mohm-cm) and may be substantially transparent. If the material is not optically transparent, the fixed resistors 1305 may be made small enough that they cannot readily be perceived as an optical artifact. In some implementations, the fixed resistors 1305 may be formed of a silicon oxide, of a silicon oxide doped with one or more metals, or of a zinc oxide. The fixed resistor may be formed within the via opening as shown. In some configurations, the fixed resistor may extend from inside the via opening to a region around the via opening (not shown), or otherwise be positioned between an intermediate conductor and lower electrode at each sensel.

Because the intermediate conductors 920b are in series with the fixed resistors 1305, the electrodes 920a and/or the intermediate conductors 920b may be formed of a material such as ITO that has a relatively higher sheet resistance (e.g., 0.05-2 kohm/sq) as compared to that of a conductive metal. Due to the presence of the fixed resistors 1305, the switch resistance of each sensel 950h may nonetheless be made significantly larger (e.g., 10-100 times larger) than that of the row or column electrodes. Each of the intermediate conductors 920b may therefore have a relatively high resistance (e.g., <10 kohm). Thus, a very thin (such as about 25-500 Å) transparent conductive oxide material such as ITO may be used to form the intermediate conductors 920b, which can be optically advantageous due to low optical absorption.

Figure 14:
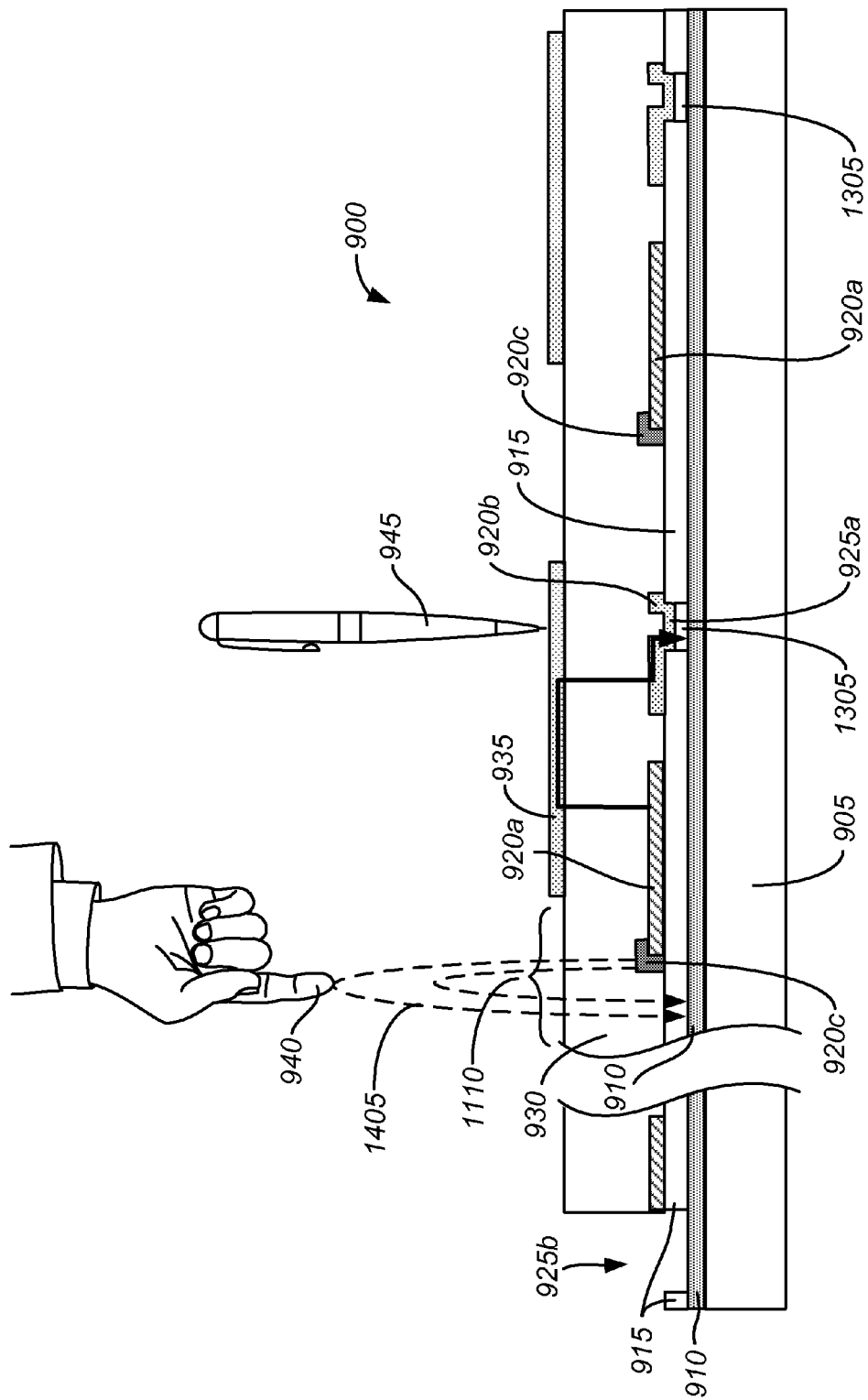
FIG. 14 shows an example of a cross-section through a touch sensor having exposed projected capacitive touch areas.

FIG. 14 shows an example of a cross-section through a touch sensor having exposed projected capacitive touch areas. In such implementations, the touch sensor device 900 may include both PCT and DRT functionality. This implementation of the touch sensor device 900 includes projected capacitive touch areas 1110, in which spaces between the conductive bridges 935 at least partially expose the electrodes 910 and the electrodes 920c.

In this example, the electrodes 910 form row electrodes and the electrodes 920c form column electrodes of the touch sensor device 900. The electrodes 920c are formed, at least in part, of a conductive metal such as Al, Mo, or Ni in this example. The column electrodes 920c may be on the order of 1-5 microns wide or more, with spaces on the order of 5-50 microns or more. The intermediate conductors 920b and second intermediate conductors 920a may be configured to detect stylus or finger touches with minimal impact on the optical image quality of a display that is viewed through the touch sensor device 900. In some implementations, such detection capabilities may be provided by forming the intermediate conductors 920b and the second intermediate conductors 920a as adjacent and/or interdigitated electrically conducting transparent contact surfaces at a fine pitch (see, e.g., FIGS. 11B and 11C). In some implementations, the second intermediate conductor 920a is appended to electrodes 920c. The proximity of the finger 940 may be detected by the touch sensor device 900 in the projected capacitive touch areas 1110 due to the effect of the finger 940 on the electric field 1405: the finger 940 (or a stylus) can cause a change in the mutual capacitance between row electrodes and column electrodes of the touch sensor device 900. In some implementations, the column electrodes 920c may be formed (at least in part) of an optical stack that is configured to reduce and/or minimize the reflection of incident light. In some such implementations, the optical stack may be similar to that of the black mask structure 23 described above.

Figure 15:
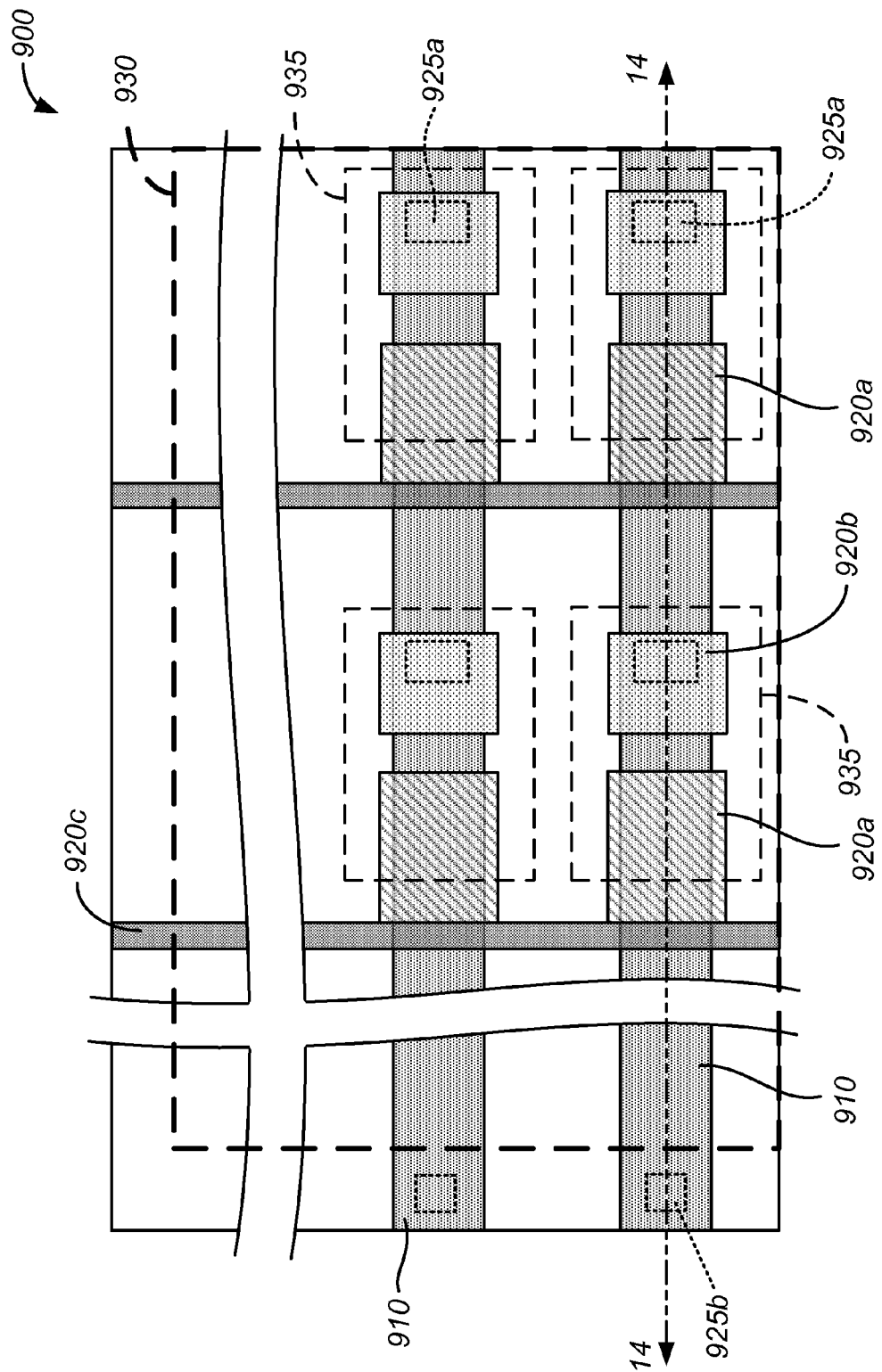
FIG. 15 shows an example of a plan view of a portion of the touch sensor of FIG. 14.

FIG. 15 shows an example of a plan view of a portion of the touch sensor of FIG. 14. As noted above, the electrodes 910 form row electrodes and the electrodes 920c form column electrodes of the touch sensor device 900. Instead of being formed integrally with the column electrodes, as shown in FIG. 10, the second intermediate conductors 920a form discontinuous rectangles that are appended to the continuous column electrodes 920c. By substituting column electrodes made of a relatively lower conducting material such as a transparent conductive oxide (TCO) for column electrodes made of a highly conductive metal, the parasitic line resistance of the columns may be decreased, as compared to the implementation shown in FIG. 10. This decrease in parasitic line resistance can result in improved detection of sensel states in the touch sensor device 900. Since the column electrode 920c is substantially opaque when formed in metal and the second intermediate conductor 920a must cover a large fraction of the sensel area to ensure reliable touch registration, it may be desirable that the second intermediate conductors 920a be made of a substantially transparent material such as ITO. In some implementations, the row electrodes of the touch sensor device 900 also may be formed, at least in part, of a conductive metal.

Figure 16:
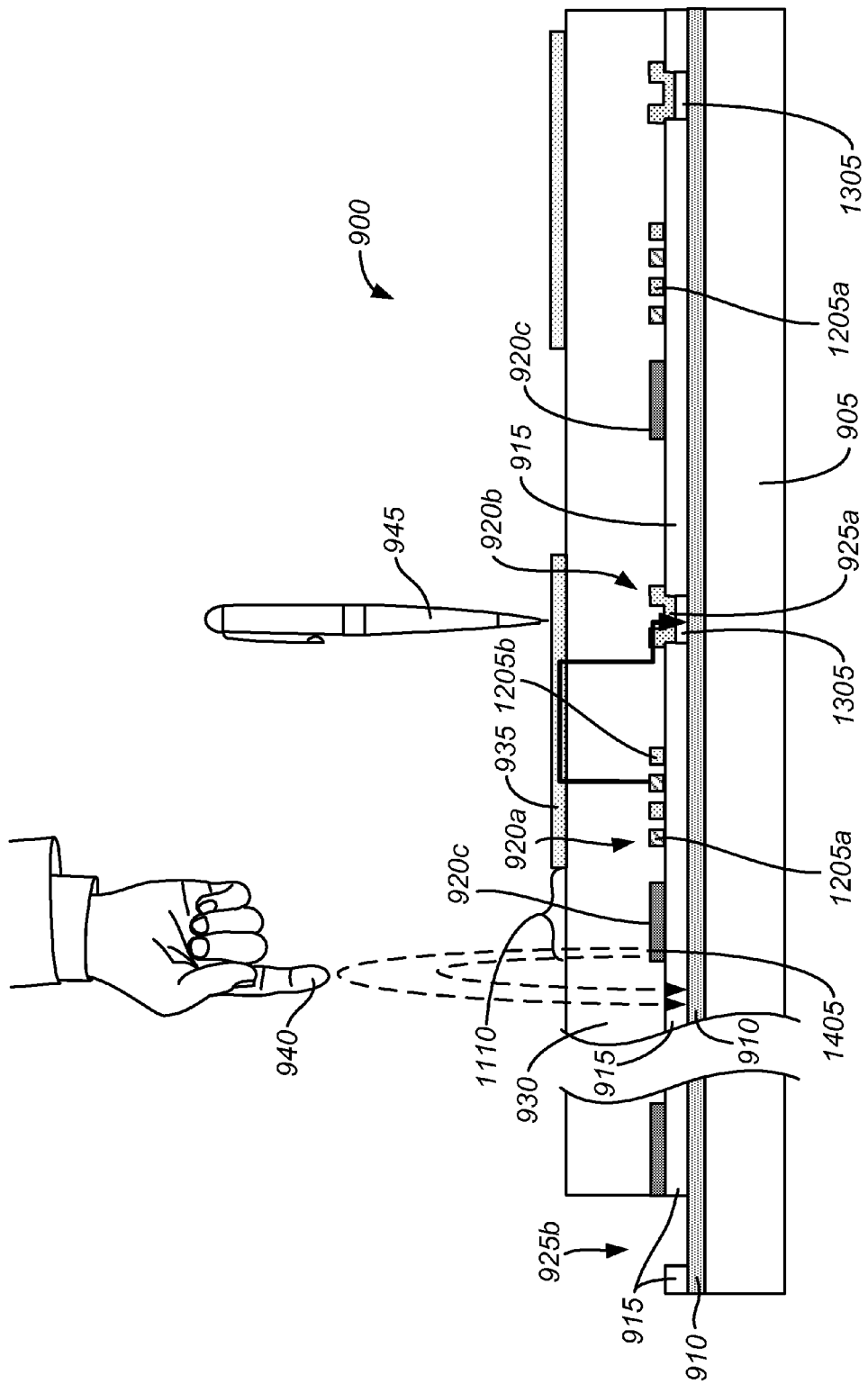
FIG. 16 shows an example of a cross-section through a touch sensor having intermediate conductor branches and electrode branches.
Figure 17:
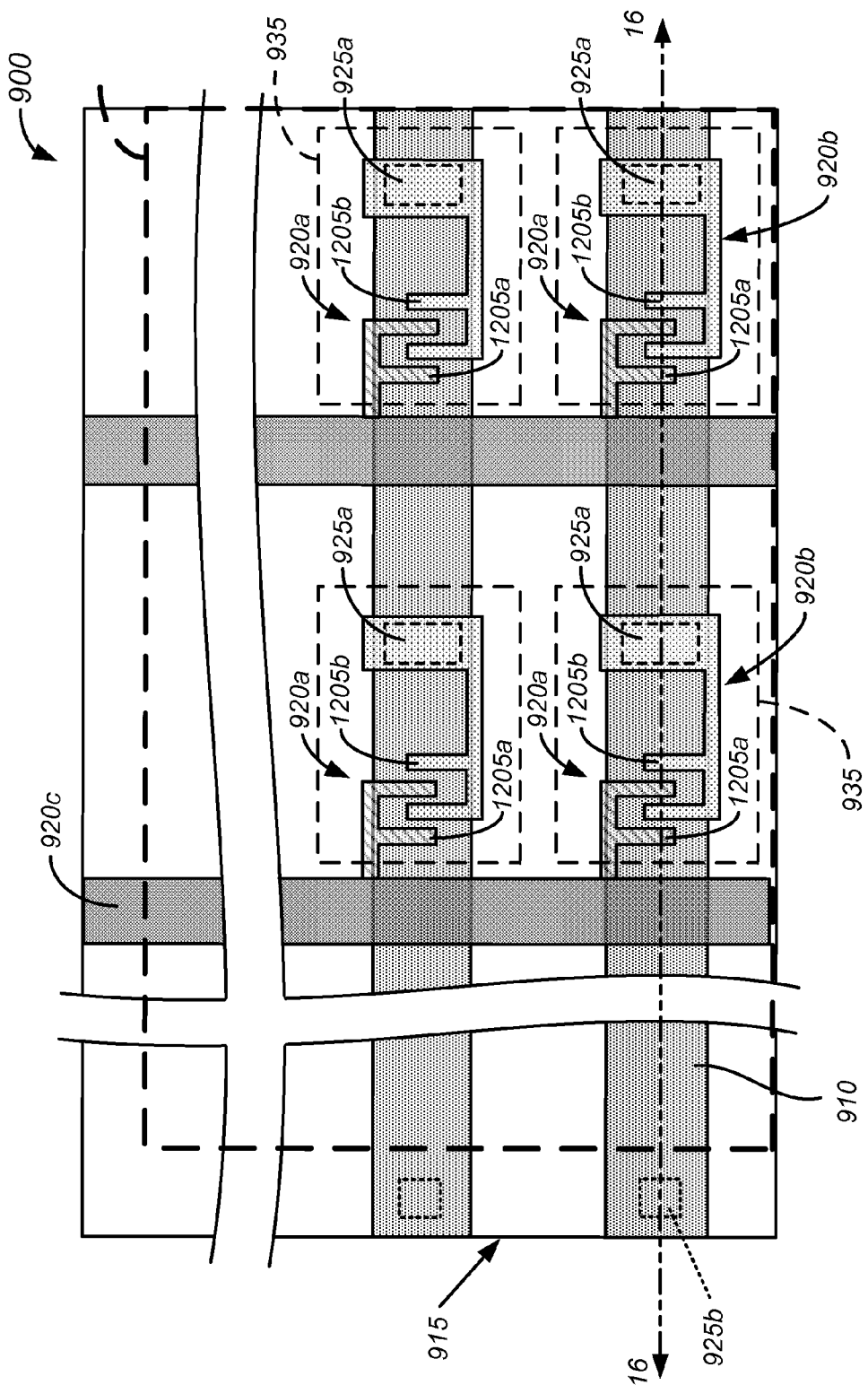
FIG. 17 shows an example of a plan view of a portion of the touch sensor of FIG. 16.

FIG. 16 shows an example of a cross-section through a touch sensor having intermediate conductor branches and electrode branches. FIG. 17 shows an example of a plan view of a portion of the touch sensor of FIG. 16. This implementation is similar to that shown in FIGS. 14 and 15. However, in the touch sensor device 900 shown in FIG. 16, the second intermediate conductors 920a and the intermediate conductors 920b are formed of a conductive metal. In some implementations, the second intermediate conductors 920a can be formed from the same metal layer as the column electrode 920c.

The branches 1205a of the second intermediate conductors 920a and the branches 1205b of the intermediate conductors 920b are comb-shaped with inter-digitated tines in this example (see FIG. 17). The spacing between the branches 1205a and the branches 1205b may be on the order of microns, and in some implementations, about 3-5 microns. In alternative implementations, the branches 1205a and/or the branches 1205b may be L-shaped, spiral-shaped, etc. In some implementations, forming the second intermediate conductors 920a and the intermediate conductors 920b of a conductive metal wire frame instead of a TCO may increase both the conductivity of these elements and the overall transparency of the touch sensor device 900.

Figure 18:
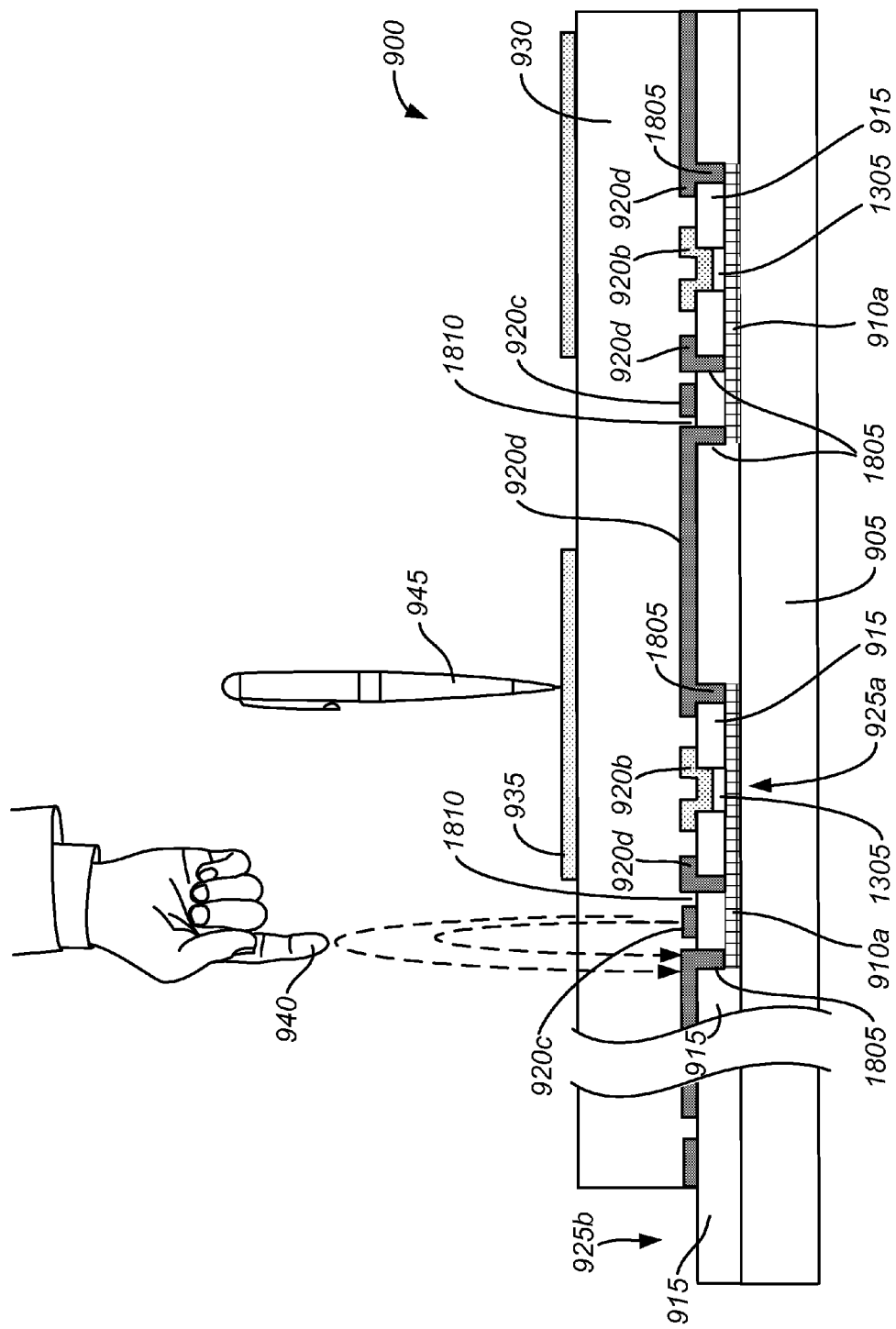
FIG. 18 shows an example of a cross-section through a touch sensor having jumpers that are configured to form electrical connections between portions of electrode rows or columns.

FIG. 18 shows an example of a cross-section through a touch sensor having jumpers that are configured to form electrical connections between portions of electrode rows or columns. In this implementation, the row electrodes 920d and the column electrodes 920c of the touch sensor device 900 are primarily formed in a different layer than that of the second intermediate conductor 920a and the intermediate conductor 920b. The row and column electrodes are formed in the same layer of a thin conductive metal in this example (see FIG. 19). The second intermediate conductor 920a and the intermediate conductor 920b are formed from a substantially transparent conductive material such as a TCO.

The second intermediate conductors 920a are appended to the column electrodes 920c and cover a substantial portion of the sensel area to assure DRT sensitivity. The intermediate conductors 920b form electrical connections through the vias 925a and may also cover a substantial portion of the sensel area. The gaps 1810 prevent shorting between the column electrodes 920c and the row electrodes 920d.

Unlike the electrodes 910 of the above-described implementations, the jumpers 910a do not form continuous rows across the substrate 905. Instead, the jumpers 910a are localized and are configured in one or more "L" shapes to form electrical connections between discontinuous portions of the row electrodes 920d, and between the row electrodes 920d and the intermediate conductors 920b by way of the vias 925a. In some implementations, a portion of the thin metal layer used to form electrodes 920a and 920d can be patterned over the second intermediate conductors 920b in a region above the vias 925a to ensure electrical continuity between the intermediate conductors 920b and the jumpers 910a. In some implementations, fixed resistors 1305 are formed between the jumpers 910a and the vias 925a. The jumpers 910a are formed of a conductive metal such as Al, Mo or Ni and are isolated from the column electrodes 910c by the insulating layer 915. The connecting portions 1805 form electrical connections with the jumpers 910a on either side of the column electrodes 920c. In some implementations, the connecting portions 1805 may be formed as part of the layer that forms the row electrodes 920d.

Figure 19:
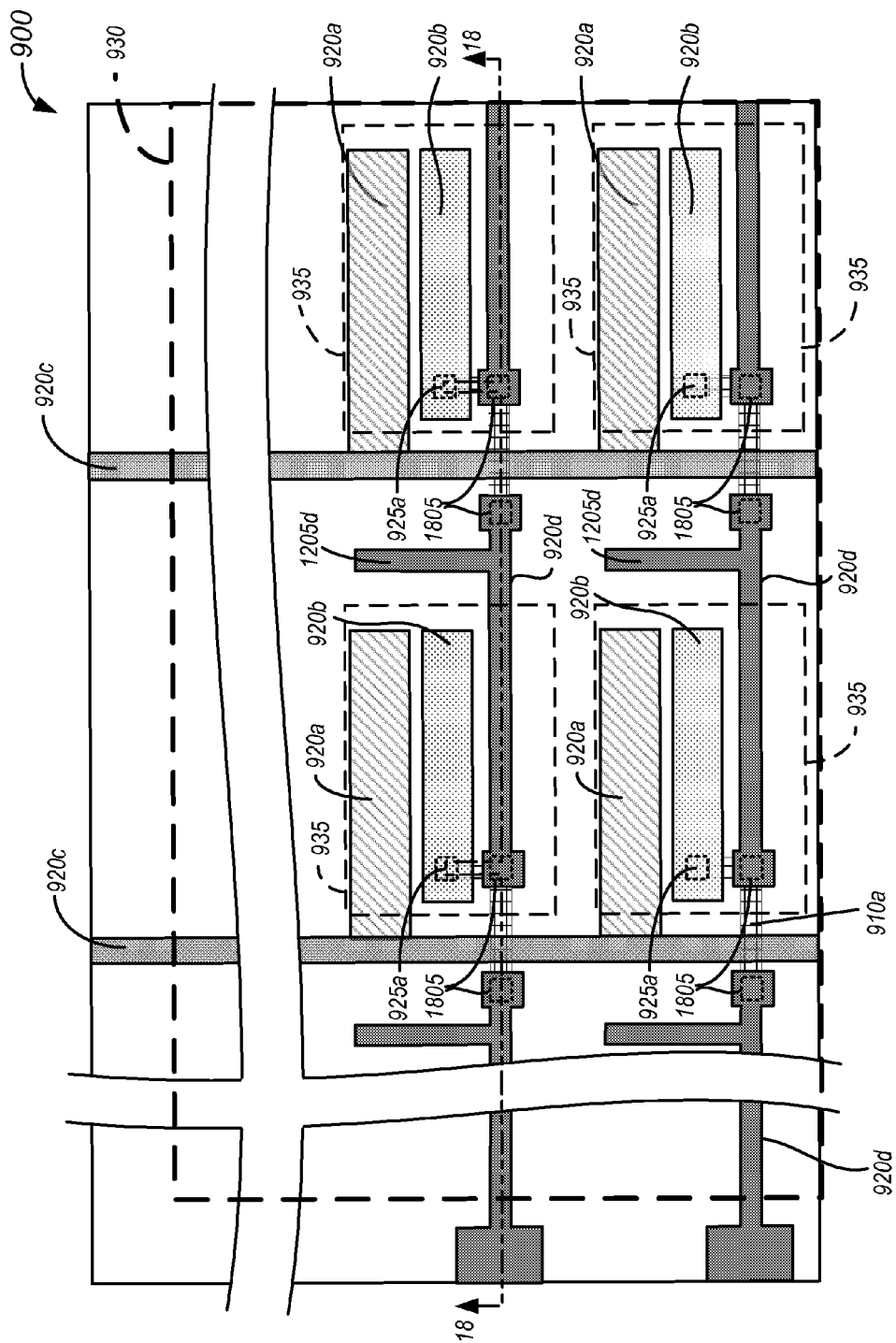
FIG. 19 shows an example of a plan view of a portion of the touch sensor of FIG. 18.

FIG. 19 shows an example of a plan view of a portion of the touch sensor of FIG. 18. Referring to FIG. 19, it will be observed that the intermediate conductors 920b are substantially electrically isolated from the row electrode 920d in this example. Here, the connecting portions 1805 are formed through the insulating layer 915 to enable electrical connections between the row electrode 920d and the jumper 910a, and the vias 925a are formed to enable connections between the intermediate electrodes 920b and the jumper 910a. In some implementations, the fixed resistors 1305 are formed between the jumpers 910a and the vias 925a (not shown). A black mask layer similar to structure 23 described above can be positioned above the fixed resistors 1305 to reduce the appearance of optical artifacts. In some implementations, the black mask structure can be formed of the same layers as row electrodes 920d and column electrodes 920c. In this implementation, the row electrodes 920d include the branches 1205d, which are substantially parallel to the column electrodes 920c.

Figure 20:
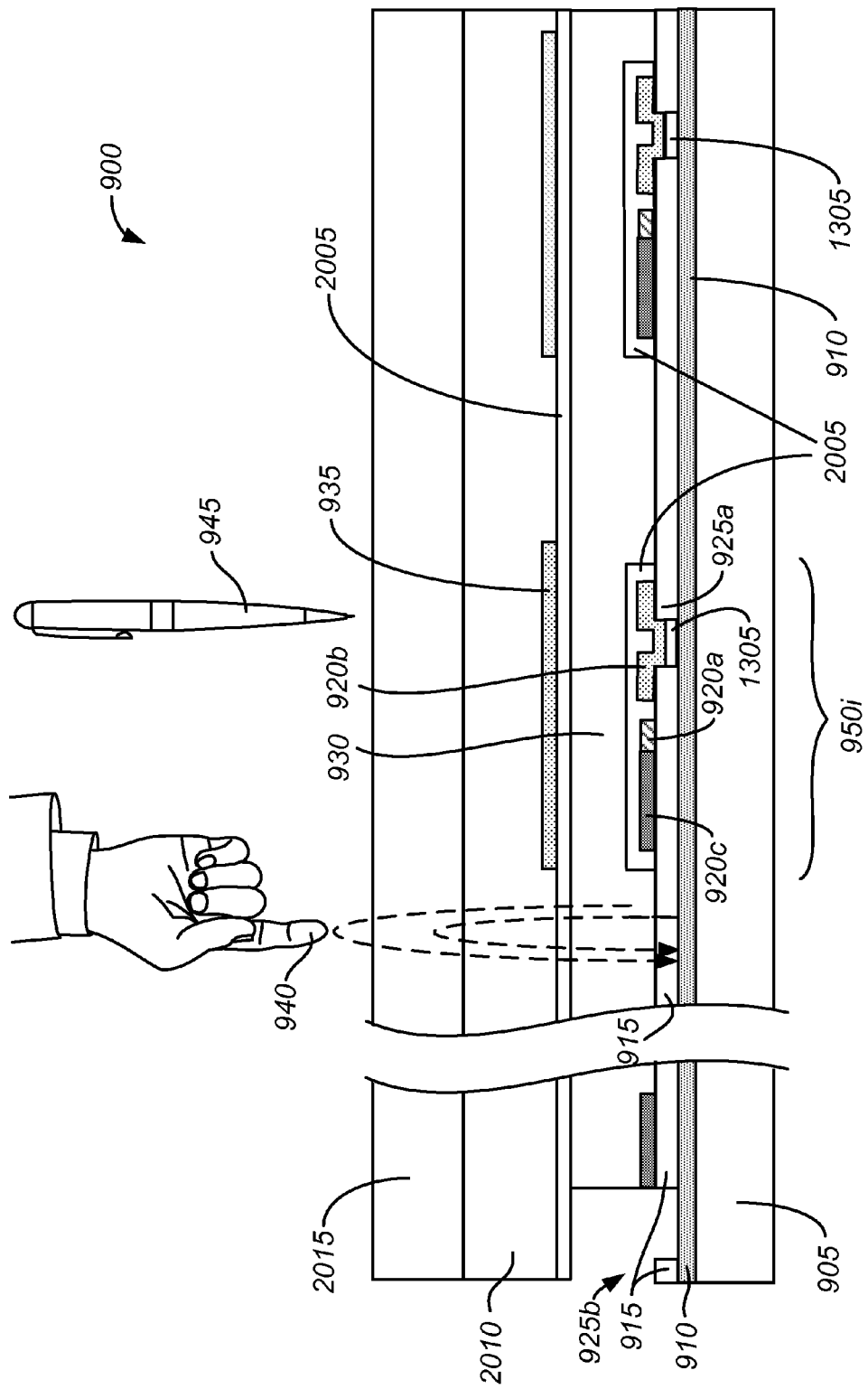
FIG. 20 shows an example of a cross-section through a touch sensor having a flexible layer and a force-spreading layer.

FIG. 20 shows an example of a cross-section through a touch sensor having a flexible layer and a force-spreading layer. Without a protective membrane on the top surface, the touch sensor device 900 may be susceptible to environmental damage such as abrasion, exposure to ultraviolet light, etc. In addition, some desirable layer stacks may only be commercially available in combination with a flexible substrate (e.g., products including (a) a flexible membrane and patterned ITO or (b) a flexible membrane, patterned ITO and nominally unpatterned FSR). So as to mitigate the susceptibility to environmental damage and to enable the use of some commercially-available products, some implementations of the touch sensor device 900 may include a flexible layer 2010.

In some such examples, the flexible layer 2010 may be a clear plastic film made of polyethylene terephthalate (PET), polyethylene naphthalate (PEN), polyimide, or a similar material. In some implementations, the flexible layer 2010 may have a thickness of about 5-100 microns, a modulus of elasticity of about 1-20000 MPa, and an optical absorption in the visible light spectrum of about 0.5-10%. In some examples, the flexible layer 2010 may have a modulus of elasticity in the range of 0.5-5 GPa.

A problem with some sensel arrays is that their sensel pitch may be larger than the area of sensitivity of the sensel. In other words, the sensels may be spaced too far apart to detect finger touch or stylus input at an arbitrary location on the array. In some implementations, the addition of a force spreading layer 2015 on top of the sensor can spread the force so that the area of sensitivity of the sensel is increased to be larger than the sensel pitch, thereby increasing the likelihood that touch or stylus input is detected.

In some implementations, the force spreading layer 2015 may include more than one layer. For example, the force spreading layer 2015 may include at least two layers, a bottom layer that spreads the force, and a top layer similar to the flexible layer 2010, an anti-reflection coating, or a hard coat that protects the force spreading layer. In some implementations, the force spreading layer 2015 may have a modulus of elasticity of about 1-1000 MPa, and an optical absorption in the visible light spectrum of about 0.1-5%. In some implementations, the combined thickness of the flexible layer 2010 and the force spreading layer 2015 may be approximately the same as the width of the sensel 950i. In some implementations, the total thickness of the force spreading layer may be on the order of the spacing between an intermediate conductor 920b and an electrode 910 or a second intermediate conductor 920a.

There are various locations in the layer stack at which it is desirable to have both a good mechanical (good adhesion) and good electrical (low contact resistance) interface. Such a good interface may in some cases be formed by using appropriate deposition/application, etch and cleaning processes. However, some implementations of the touch sensor device 900 include a conductive adhesive 2005 between some elements. The conductive adhesive 2005 may be substantially transparent. The conductive adhesive 2005 may be disposed locally around some elements, such as the electrodes 920c and the intermediate conductors 920b.

In some implementations, the conductive adhesive 2005 may be applied globally: in FIG. 20, for example, the conductive adhesive 2005 has been applied to the entire upper surface of the FSR layer 930. Shorting between the conductive bridges 935 may be avoided due to the relatively low conductivity of the conductive adhesive 2005: in some such implementations, the conductive adhesive 2005 may have a bulk resistivity in the range of about 1e4-1e7 ohm-cm. The conductive adhesive 2005 may have a thickness in the range of about 4 Å to 4 microns. In some implementations of the conductive adhesive 2005, the index n is in the range of 1.3-1.6 and k is less than about 0.005.

Some implementations may include a substantially transparent but substantially non-conductive adhesive between layers that require only a mechanical bond and not an electrical bond. In some such implementations, the adhesive may be similar to that which is commercially available and known as an Optically Coupling Adhesive (OCA) or an Optically Conductive Resin (OCR).

Figure 21:
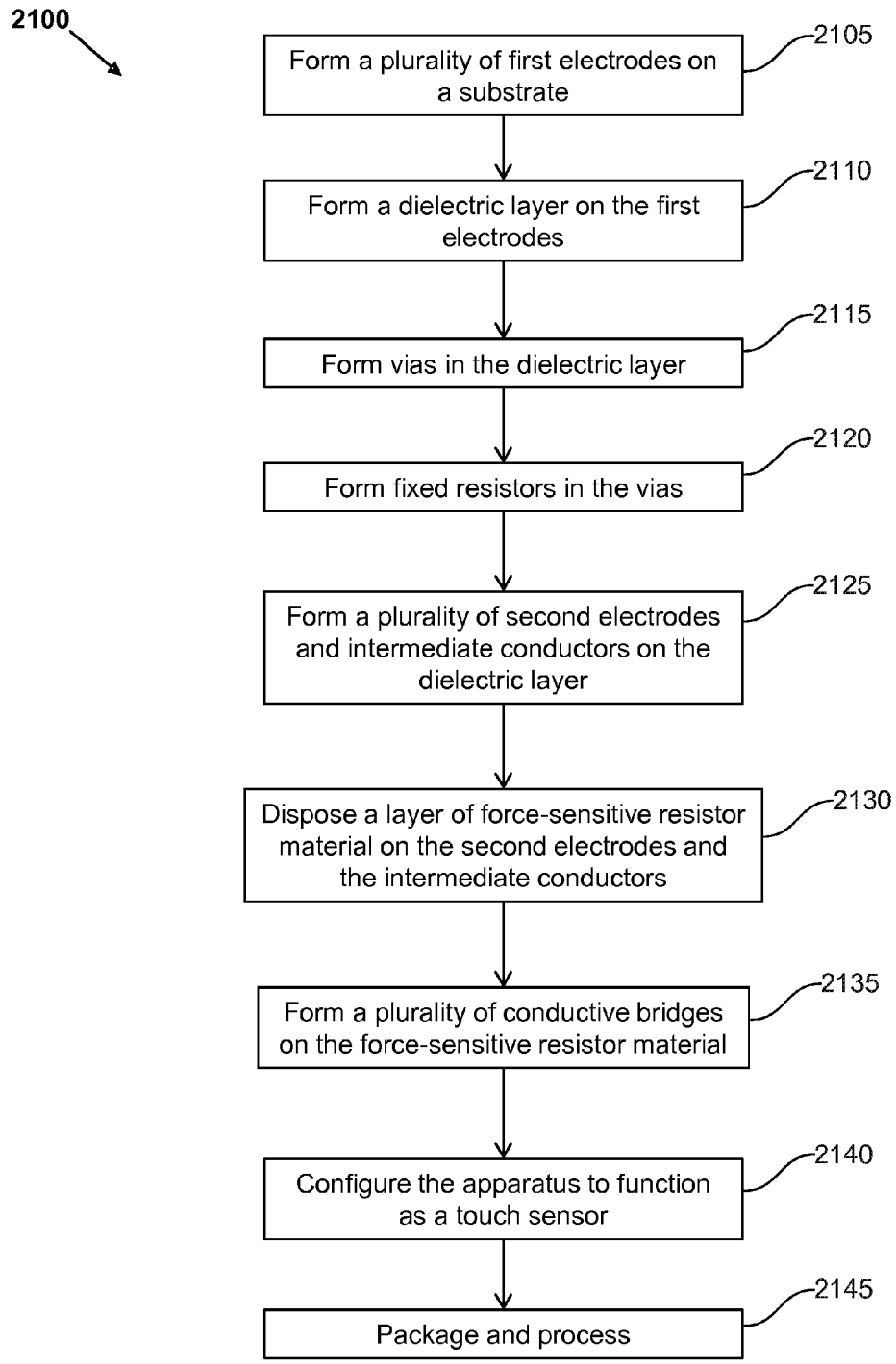
FIG. 21 shows an example of a flow diagram illustrating a manufacturing process for a touch sensor device.

FIG. 21 shows an example of a flow diagram illustrating a manufacturing process for a touch sensor device. The blocks of the process 2100 may or may not be performed in the sequence indicated in FIG. 21. Moreover, some implementations of the process 2100 may include more or fewer blocks. Accordingly, the process 2100 may be adapted to manufacture any of the touch sensor devices 900 shown and/or described herein, as well as variations thereof. Except where otherwise noted, the blocks of the process 2100 may involve semiconductor fabrication processes such as deposition, etching, etc.

In this example, the process 2100 begins with block 2105, which involves forming a plurality of first electrodes on a substrate. In some such implementations, block 2105 may involve forming the electrodes 910 on the substrate 905 into row or column electrodes (see, e.g., FIG. 20). In alternative implementations, block 2105 may involve forming the jumpers 910a on the substrate 905 (see FIG. 18). Block 2105 also may involve forming routing wires on the substrate 905.

In this example, resistor material is deposited on the first electrodes and patterned to form fixed resistors, such as the fixed resistors 1305 described above (block 2110). However, some implementations of the process 2100 may not include the block 2110. Instead, the resistance of one or more other elements may be configured to compensate for the lack of a fixed resistor 1305. As noted above, for example, if the conductive bridge 935 has a sufficiently high resistance then the conductive bridge 935 may provide the functionality of the fixed resistor 1305. Alternatively, the FSR layer, even when pressed to an extreme, may provide the functionality of the fixed resistor 1305.

The process 2100 continues with block 2115, which involves forming a dielectric layer on the plurality of first electrodes on a substrate. In some such implementations, block 2115 may involve forming a layer similar to the dielectric layer 915 on the electrodes 910 or on the jumpers 910a, as well as on exposed portions of the substrate 905. Vias, such as the vias 925a and 925b, may be formed through the dielectric layer in block 2120.

In this implementation, block 2125 involves forming a plurality of second electrodes and intermediate conductors on the dielectric layer. The second electrodes may, in some implementations, include row or column electrodes. Depending on the particular implementation of the touch sensor device 900 that is being fabricated, block 2125 may involve forming the second intermediate conductors 920a, the intermediate conductors 920b, the column electrodes 920c and/or the row electrodes 920d as described above. In some implementations, the second electrodes and/or the intermediate conductors may be formed, at least in part, of ITO or another TCO. However, the second electrodes and/or the intermediate conductors also may be formed, at least in part, from a conductive metal such as Al, Mo or Ni.

In some implementations, the second intermediate conductors 920a, the intermediate conductors 920b, the column electrodes 920c, and/or the row electrodes 920d may include branches. The branches may be L-shaped, spiral-shaped, shaped as interdigitated comb fingers, etc. (see FIGS. 12A-12C).

Block 2130 involves disposing a layer of FSR material on the second electrodes and the intermediate conductors. The FSR material may be substantially as described above with reference to FSR layer 930. In some implementations, the FSR material is not fabricated during the process 2100, but instead a previously-obtained layer of FSR material may be applied to the second electrodes, to the intermediate conductors, and to exposed portions of the dielectric layer. The FSR material may be shaped, patterned or otherwise prepared before it is applied. In some implementations, a conductive adhesive material may be applied to the second electrodes and/or to the intermediate conductors before the FSR material is applied (see, e.g., FIG. 20). In some implementations, another layer of conductive adhesive material may be applied to the FSR material.

A plurality of conductive bridges may then be applied to the FSR material (block 2135). The conductive bridges may be configured to form open regions, also referred to herein as projected capacitive touch areas 1110, where the first electrodes and/or the second electrodes are at least partially exposed. The conductive bridges may be configured as squares, rectangles, diamonds, segmented strips, curvilinear stripes, curvilinear segments, hollowed geometries, framed geometries, or other shapes (see FIGS. 11A-11C).

In some implementations, the conductive bridges may be applied to the conductive adhesive material that overlies the FSR material. Moreover, in some implementations the conductive bridges may be applied to the conductive adhesive material and/or the FSR material before the FSR material is applied to the second electrodes and intermediate conductors. In other words, block 2135 may precede block 2130 in some implementations.

In some implementations, a flexible layer and/or a force-spreading layer may be applied to the conductive bridges and the FSR material. These layers may be applied before or after block 2130, depending on the implementation.

In block 2140, the apparatus is configured, at least in part, to function as a touch sensor. For example, individual display-sized portions may be singulated. A touch controller or other such device may be configured for communication with row electrodes and column electrodes of the touch sensor device 900, e.g., by connecting the touch controller with routing wires. The touch controller may be configured to determine a touch location of a finger, a conductive stylus, etc., that is in contact with (or is located near) the touch sensor device 900. The touch controller may be configured to make such determinations based, at least in part, on detected changes in capacitance and/or resistance in the vicinity of the touch location.

Block 2145 may involve further packaging and/or processing. For example, the touch sensor devices 900 may be packaged for storage and/or shipment. In some implementations, the touch sensor devices 900 may be incorporated with display devices.

Figure 22A:
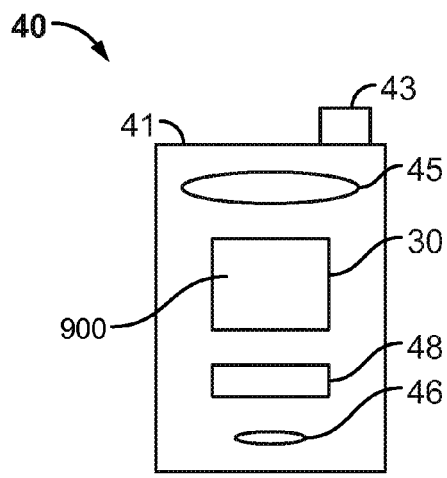
FIGS. 22A and 22B show examples of system block diagrams illustrating a display device that include a touch sensor as described herein.
Figure 22B:
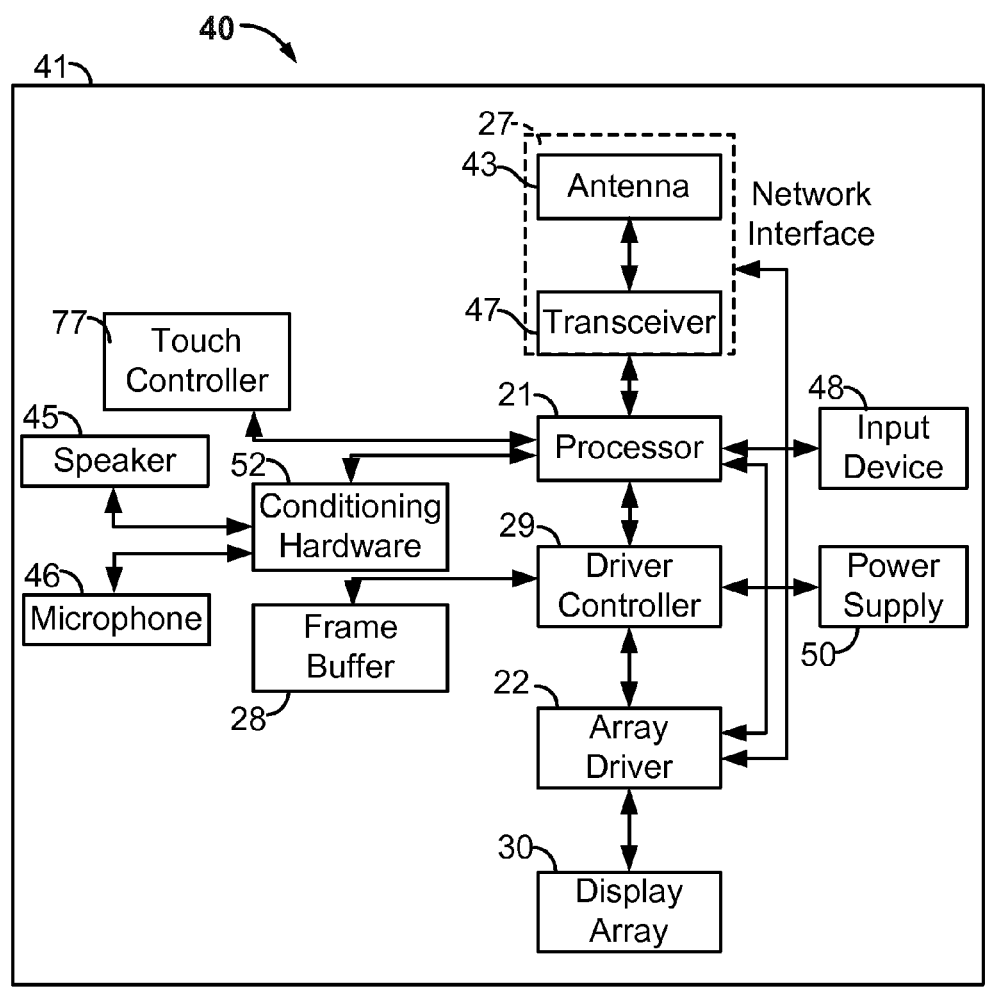

FIGS. 22A and 22B show examples of system block diagrams illustrating a display device that includes a touch sensor as described herein. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, a touch sensor device 900, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD display, as described herein. The touch sensor device 900 may be a device substantially as described herein.

The components of the display device 40 are schematically illustrated in FIG. 22B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

In this example, the display device 40 also includes a touch controller 77. The touch controller 77 may be configured for communication with the touch sensor device 900, e.g., via routing wires, and may be configured for controlling the touch sensor device 900. The touch controller 77 may be configured to determine a touch location of a finger, a conductive stylus, etc., proximate the touch sensor device 900. The touch controller 77 may be configured to make such determinations based, at least in part, on detected changes in capacitance and/or resistance in the vicinity of the touch location. In alternative implementations, however, the processor 21 (or another such device) may be configured to provide some or all of this functionality.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43. The processor 21 may be configured to receive time data, e.g., from a time server, via the network interface 27.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone integrated circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD (or any other device) as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A touch sensor apparatus, comprising:
   a substrate;
   a plurality of first electrodes disposed on the substrate;
   a dielectric layer disposed on the plurality of first electrodes;
   a plurality of second electrodes disposed on the dielectric layer;
   a plurality of intermediate conductors disposed on the dielectric layer and configured for electrical communication with the first electrodes through vias formed in the dielectric layer;
   a layer of force-sensitive resistor (FSR) material disposed on the second electrodes and the intermediate conductors; and
   a plurality of conductive bridges disposed on the FSR material, each of the conductive bridges being disposed above at least one of the intermediate conductors, wherein the FSR material is configured to form at least one substantially vertical electrical connection between one of the conductive bridges, one of the second electrodes, and one of the intermediate conductors when a force is applied to the FSR material.

2. The apparatus of claim 1, wherein the substrate is substantially transparent.

3. The apparatus of claim 1, further including a fixed resistor disposed between one of the intermediate conductors and one of the first electrodes.

4. The apparatus of claim 1, wherein an open region between the conductive bridges at least partially exposes a projected capacitive touch (PCT) area of the first electrodes and the second electrodes and wherein the touch sensor apparatus is configured for enabling the measurement of changes in mutual capacitance between the first electrodes and the second electrodes.

5. The apparatus of claim 4, wherein at least one of the first electrodes or the second electrodes includes a conductive portion in the exposed PCT area.

6. The apparatus of claim 1, wherein some of the conductive bridges are disposed, at least in part, above one of the second electrodes.

7. The apparatus of claim 1, wherein the conductive bridges are formed into at least one of islands, segmented strips, curvilinear stripes, curvilinear segments, diamond shapes, hollowed geometries, or framed geometries.

8. The apparatus of claim 1, wherein at least one of the first electrodes, the second electrodes, or the intermediate conductors include branches.

9. The apparatus of claim 8, wherein the branches are formed into at least one of L-shapes, spirals, or interdigitated shapes.

10. The apparatus of claim 8, wherein the intermediate conductor branches are interdigitated with first electrode branches or second electrode branches.

11. The apparatus of claim 1, wherein at least one of the first electrodes, the intermediate conductors, or the second electrodes is formed of a substantially transparent conductive material.

12. The apparatus of claim 1, wherein at least one of the first electrodes or the second electrodes includes a substantially transparent conductive material and a conductive metal.

13. The apparatus of claim 1, wherein at least a portion of one of the first electrodes or the second electrodes is formed of metal.

14. The apparatus of claim 1, further including a force-spreading layer disposed above the conductive bridges and the FSR material.

15. The apparatus of claim 1, further including conductive adhesive material disposed between the FSR material and at least one of the conductive bridges, the intermediate conductors, the second electrodes, a flexible layer, a dielectric layer, or a force-spreading layer.

16. The apparatus of claim 15, wherein the conductive adhesive material is substantially transparent.

17. The apparatus of claim 1, wherein the second electrodes include row electrodes and column electrodes, and wherein the first electrodes include jumpers configured to form electrical connections along at least one of the row electrodes or the column electrodes.

18. The apparatus of claim 1, further comprising:
a display;
a processor that is configured to communicate with the display, the processor being configured to process image data; and
a memory device that is configured to communicate with the processor.

19. The apparatus of claim 18, further comprising:
a driver circuit configured to send at least one signal to the display; and
a controller configured to send at least a portion of the image data to the driver circuit.

20. The apparatus of claim 18, further comprising:
an image source module configured to send the image data to the processor, wherein the image source module includes at least one of a receiver, a transceiver or a transmitter.

21. The apparatus of claim 18, further comprising:
an input device configured to receive input data and to communicate the input data to the processor.

22. The apparatus of claim 18, further comprising:
a touch controller configured for communication with the processor; and
routing wires configured for connecting at least one of the first electrodes or the second electrodes to the touch controller.

23. An apparatus, comprising:
substrate means;
first electrode means disposed on the substrate means;
dielectric means disposed on the first electrode means;
second electrode means disposed on the dielectric means;
intermediate conductor means disposed on the dielectric means and configured for electrical communication with the first electrode means;
force-sensitive resistor (FSR) means disposed on the second electrode means and the intermediate conductor means; and
conductive bridge means disposed on the FSR means and disposed above at least a portion of the intermediate conductor means, wherein the FSR means includes means for making at least one substantially vertical electrical connection between an instance of the conductive bridge means, an instance of the second electrode means, and an instance of the intermediate conductor means when a force is applied to the FSR means.

24. The apparatus of claim 23, further including fixed resistor means disposed between the intermediate conductor means and the first electrode means.

25. The apparatus of claim 23, wherein the conductive bridge means at least partially exposes a projected capacitive touch (PCT) area of the first electrode means and the second electrode means and wherein the apparatus is configured for measuring changes in mutual capacitance between the first electrode means and the second electrode means.

26. The apparatus of claim 25, wherein at least one of the first electrode means or the second electrode means includes a conductive portion in the exposed PCT area.

27. A method of fabricating a touch sensor apparatus, the method comprising:
forming a plurality of first electrodes on a substrate;
forming a dielectric layer on the plurality of first electrodes;
forming vias in the dielectric layer;
forming a plurality of second electrodes on the dielectric layer;
forming a plurality of intermediate conductors on the dielectric layer, the intermediate conductors being configured for electrical communication with the first electrodes through the vias;
disposing a layer of anisotropic force-sensitive resistor (FSR) material on the second electrodes and the intermediate conductors; and
forming a plurality of conductive bridges on the FSR material, each of the conductive bridges being disposed above at least one of the intermediate conductors, wherein the FSR material is configured to form at least one substantially vertical electrical connection between one of the conductive bridges, one of the second electrodes, and one of the intermediate conductors when a force is applied to the FSR material.

28. The method of claim 27, further including disposing a fixed resistor between one of the intermediate conductors and one of the first electrodes.

29. The method of claim 27, wherein an open region between the conductive bridges at least partially exposes a projected capacitive touch (PCT) area of the first electrodes and the second electrodes, further including configuring the touch sensor apparatus for measuring changes in mutual capacitance between the first electrodes and the second electrodes.

30. The method of claim 29, wherein at least one of the first electrodes or the second electrodes includes a conductive portion in the exposed PCT area.

31. The method of claim 30, wherein the conductive portion is formed, at least in part, of a conductive metal.

32. The method of claim 27, wherein forming the plurality of conductive bridges involves forming some of the conductive bridges to extend above at least one of the second electrodes.

* * * * *